US011675068B2

(12) United States Patent
Jiang

(10) Patent No.: US 11,675,068 B2
(45) Date of Patent: Jun. 13, 2023

(54) DATA PROCESSING METHOD AND DEVICE BASED ON MULTI-SENSOR FUSION, AND MULTI-SENSOR FUSION METHOD

(71) Applicant: Shanghai YuGan Microelectronics Co., Ltd, Shanghai (CN)

(72) Inventor: Hong Jiang, Shanghai (CN)

(73) Assignee: Shanghai YuGan Microelectronics Co., Ltd, Shanghai (CN)

( * ) Notice: Subject to any disclaimer, the term of this patent is extended or adjusted under 35 U.S.C. 154(b) by 304 days.

(21) Appl. No.: 17/040,191

(22) PCT Filed: Mar. 13, 2019

(86) PCT No.: PCT/CN2019/078001
§ 371 (c)(1),
(2) Date: Sep. 22, 2020

(87) PCT Pub. No.: WO2019/184709
PCT Pub. Date: Oct. 3, 2019

(65) Prior Publication Data
US 2021/0012165 A1  Jan. 14, 2021

(30) Foreign Application Priority Data

Mar. 29, 2018 (CN) .......... 201810280358.2
Feb. 20, 2019 (CN) .......... 201910127976.8

(51) Int. Cl.
*G01S 13/86* (2006.01)
*G06F 16/28* (2019.01)
(Continued)

(52) U.S. Cl.
CPC ........ *G01S 13/865* (2013.01); *G06F 16/2465* (2019.01); *G06F 16/283* (2019.01);
(Continued)

(58) Field of Classification Search
None
See application file for complete search history.

(56) References Cited

U.S. PATENT DOCUMENTS

2016/0116573 A1* 4/2016 Appia ................ G01S 13/867
342/52
2017/0371329 A1* 12/2017 Giering ................ G06V 10/82
2020/0357104 A1* 11/2020 Luo ........................... G06T 7/40

FOREIGN PATENT DOCUMENTS

CN  102789640  11/2012
CN  102842124  12/2012
(Continued)

OTHER PUBLICATIONS

PCT/CN2019/078001 International Search Report dated Mar. 10, 2020 and English translation.
(Continued)

*Primary Examiner* — Leon Viet Q Nguyen
(74) *Attorney, Agent, or Firm* — NZ Carr Law Office

(57) ABSTRACT

A data processing method, device and multi-sensor fusion method for multi-sensor fusion, which can group data captured by different sensors in different probe dimensions to simultaneous interpreting deep learning data based on pixel elements in the multi-dimensional matrix structure, thereby realize the more effective data mining and feature extraction to support more effective ability of environment perception and target detection.

12 Claims, 6 Drawing Sheets

(51) Int. Cl.
*G06F 16/2458* (2019.01)
*G06F 18/25* (2023.01)
*G06F 18/214* (2023.01)
*G06V 10/80* (2022.01)
*G06V 10/82* (2022.01)
G06V 10/20 (2022.01)
G06V 20/58 (2022.01)

(52) U.S. Cl.
CPC .......... *G06F 16/284* (2019.01); *G06F 18/214* (2023.01); *G06F 18/25* (2023.01); *G06V 10/803* (2022.01); *G06V 10/82* (2022.01); G06V 10/255 (2022.01); G06V 20/58 (2022.01)

(56) References Cited

FOREIGN PATENT DOCUMENTS

| CN | 104008533 | 8/2014 |
| CN | 105372203 | 3/2016 |
| CN | 108663677 | 10/2018 |
| KR | 20170088202 | 8/2017 |

OTHER PUBLICATIONS

Jiang,Hong et al, Key Technologies in Registration and Fusion for Infrared and Visible Images.

* cited by examiner

DATA PROCESSING METHOD AND DEVICE BASED ON MULTI-SENSOR FUSION, AND MULTI-SENSOR FUSION METHOD

TECHNICAL FIELD

The invention relates to the data processing field of electronic equipment, in particular to a multi-sensor fusion data processing method, device and multi-sensor fusion procedure.

BACKGROUND

In the field of target recognition and environmental sensing, relatively complete data collection and storage are needed for environmental sensing and target detection task processing. If machine learning is adopted, a large number of positive and negative samples are needed for learning and training. In the process of target recognition, a large number of intermediate data will be generated for processing units to process and use, and there may be "cloud computing" in the process of target recognition, the participation of remote processing requires efficient data acquisition and preservation technology. At the same time, effective environment awareness and target detection need multi-dimensional probe data support.

Currently, sensors commonly used in environmental perception and target detection include image acquisition sensors, microwave radar, infrared sensor, ultrasonic radar and Lidar, etc., which are widely used in vehicle driving assistance system (ADAS) and automatic driving system, robot, AGV, home appliance, intelligent security, and various kinds of sensors. It is necessary to have the ability of environment awareness and target detection.

The image acquisition sensor (camera) can sense the texture (shape, contour, light, dark, etc.) and color of the target, and record the instantaneous image information. The camera can also record video information, string the recorded events with time axis to form a video stream, which can be used for event playback and time related event analysis. Infrared sensor (infrared camera) is a kind of image acquisition sensor, which can capture the infrared radiation information of the target and save it in the format of pictures and videos. Microwave radar (or collectively referred to as radar) can capture the relative distance, relative velocity and RCS data of targets, and output them in terms of thermal map, relative distance of target, relative velocity of target, RCS data, or point cloud data output. Lidar mainly outputs the point cloud data of the target by detecting the spatial position (relative distance, spatial angle, position and coordinate information) of the target. All kinds of sensors have their own information perception dimensions. For example, our commonly used camera can capture the image information of the target and record the texture and color information of the environment and target at the moment of shooting vividly. However, we may not be able to accurately extract the distance and speed information of the target from a single image, and it is difficult for us to predict events from a traditional photo for what will happen next. We record and analyze events in the form of video (the essence of video is a series of pictures in which the photos are shot in series and then played back according to the time axis). However, the way of video brings huge amount of data, as well as the requirement of large transmission bandwidth and storage space. The recording methods of other sensors, such as radar, ultrasonic and Lidar, can record the information of their own sensing dimensions, such as the distance and speed of the target; the data information recorded by them and the current recording method (data structure) can comprehensively describe the characteristics of the target and can be directly used for environmental perception and event prediction, the dimension and integrity of data are insufficient.

In the existing related technologies, the data detected by each sensor is independent of each other and lacks deep fusion. Furthermore, when using the detected data for feature extraction and data mining, the ability of environment perception and target detection is weak.

SUMMARY

The invention provides a data processing method, a device and a multi-sensor fusion method for multi-sensor fusion, so as to solve the problem that the data detected by the sensor lacks deep fusion.

According to a first aspect of the present invention, a data processing method for multi-sensor fusion is provided, including:

The image data of the target object and at least one set of probe data groups are obtained; the image data is detected by the image acquisition sensor, and the probe data group is detected by other sensors; the image data is used to represent the target image collected by the image acquisition sensor by using at least one pixel data matrix; different probe data groups are the detection of different detection dimensions data; the mapping relationship between image data and other probe data is established to form a multi-dimensional matrix structure on the data structure, for instance a multi-dimensional matrix structure (also called multi-dimensional pixel matrix) of matrix array of "multi-dimensional measurement parameters" is formed; thereinto:

The multi-dimensional matrix structure includes a plurality of vertically distributed matrix layers, the multiple matrix layers include at least one pixel matrix layer and at least one probe matrix layer, each pixel matrix layer corresponds to a pixel data matrix, each probe matrix layer is used to represent a set of probe data groups, and the probe data elements in the probe data group correspond to the image pixel elements in the image matrix layer; the values of the probe data elements are determined according to the value assignment of the probe data.

According to the second aspect, a data processing device for multi-sensor fusion is provided, including:

The acquisition module is used to obtain the image data of the target object and at least one set of probe data group; the image data is detected by the image acquisition sensor, and the probe data group is detected by other sensors; the image data is used to characterize the target image collected by the image acquisition sensor by using at least one pixel data matrix; different probe data groups are probe data in different detection dimension;

A forming module is used to form a multi-dimensional matrix structure;

The multi-dimensional matrix structure includes a plurality of vertically distributed matrix layers, the multiple matrix layers include at least one pixel matrix layer and at least one probe matrix layer, each pixel matrix layer corresponds to a pixel data matrix, each probe matrix layer is used to represent a set of probe data groups, and the probe data elements in the probe data group correspond to the image pixel elements in the image matrix layer; the values of the probe data elements are determined according to the value assignment of the detection data.

According to a third aspect of the invention, a multi-sensor fusion method is provided, including:

The multi-dimensional probe data from multi-sensor are combined in the form of multi-dimensional pixel matrix, and multi-dimensional depth perception matrix array with camera pixels as granularity (base unit) is established;

In the multi-dimensional pixel matrix, the information contained in each pixel is vertically expanded, a plurality of vertical dimensions are added for each pixel in addition to the originally contained brightness and color information, and the detection information of multiple corresponding dimensions detected by other sensors on the target object mapped by the pixel in the camera detection space can be input into the added vertical dimension—The information includes at least one of the following: distance, velocity, radar target RCS data, and target thermal radiation temperature distribution data; among them, the multi-dimensional detection information is assembled in a layered way on the object description which originally takes the image pixel as the unit to generate multi-dimensional pixels represented as a matrix array with a unified structure mathematically, so that each original pixel becomes a multi-dimensional pixel therefore the multi-dimensional pixel matrix is obtained.

According to a fourth aspect of the invention, a processing device is provided, including a memory and a processor;

The memory is used for storing sensing data, intermediate operation data, system output data and executable instructions of the processor;

The processor is configured to execute a method related to a first aspect and its alternatives, or a method related to a third aspect and its alternatives by executing the executable instructions.

According to a fifth aspect of the invention, a sensing device is provided, including a memory, a processor and a sensor;

The memory is used for storing sensing data, intermediate operation data, system output data, and executable instructions of the processor;

The processor is configured to execute a method related to a first aspect and its alternatives, or a method related to a third aspect and its alternatives by executing the executable instructions.

According to a sixth aspect of the present invention, a storage medium is provided on which a program is stored, which is characterized in that when the program is executed by a processor, the method involved in the first aspect and the optional scheme thereof is realized, or the method involved in the third aspect and the optional scheme thereof is implemented, and the sensing data, intermediate operation data and system output data can be stored at the same time.

The data processing method, device and multi-sensor fusion procedure provided by the invention can simultaneous interpreting and merging probe data in different dimensions of different sensors based on pixel elements and according to their imaging spatial data sampling models. The multi-dimensional matrix structure of "multi-dimensional measurement parameters" matrix array is formed in the data structure, which is combined in the form of multi-dimensional matrix structure. Then, the obtained data can be multi-level data fusion and deep learning, which can achieve more diverse and more effective data mining and feature extraction, so as to produce more effective ability of environment perception and target detection.

BRIEF DESCRIPTION OF THE DRAWINGS

In order to explain more clearly the technical solutions in the embodiment of the invention or the prior art, the drawings needed in the description of the embodiment or prior art will be briefly introduced below.

DETAILED DESCRIPTION OF THE EMBODIMENTS

In the following, the technical scheme in the embodiment of the invention will be described clearly and completely in combination with the drawings in the embodiment of the invention. Obviously, the described embodiment is only a part of the embodiment of the invention, not all the embodiments. Based on the embodiment of the invention, all other embodiments obtained by ordinary technical ways without fundamental change belong to the scope of protection of this invention.

Embodiment 1

Figure 1:
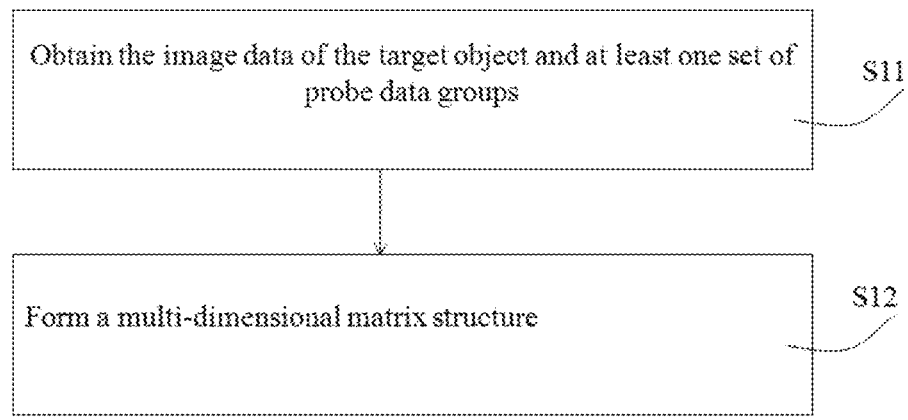
FIG. 1 is the example 1 in the invention—A flow chart of data processing method for multi-sensor fusion.

FIG. 1 is the example 1 in the invention—A flow chart of data processing method for multi-sensor fusion;

Refer to FIG. 1, data processing method of multi-sensor fusion, including:

S11: The image data of the target object and at least one set of probe data groups are obtained.

The processing method can specifically include the process of acquisition and processing, the process of storage processing, and the process of intermediate processing before storage after collection, that is, the method involved in the embodiment and the optional scheme in any process of data collection, intermediate processing and storage can be understood as the implementation of the processing method. Correspondingly, using the method involved in the present embodiment and the optional scheme in the data acquisition device, data processing device and data storage device can also be understood as the implementation of the processing method. That is, they do not deviate from the description scope of the invention and its optional schemes.

Image data can be understood as detected by image acquisition sensor. The image acquisition sensor can be any device that can realize image acquisition, such as camera, mobile phone, tablet computer, computer and other devices with built-in camera. The installation parameters, image acquisition and storage format of the image acquisition sensor can be determined in advance.

The image data can be used to characterize the target image collected by the image acquisition sensor using at least one pixel data matrix. The pixel data matrix can be changed according to different image acquisition sensors.

In one embodiment, if the image is an RGB image, where R can represent red, G can represent green, and B can represent blue, then: the RGB image can be represented by three layers of data, specifically red, green and blue data, and the data of each color can be represented by an pixel data matrix; if the image is YUV, Y can represent the brightness luma, that is, gray scale values, U and V can represent chromaticity and chromatic aberration information, and each layer of data can be represented by an image data matrix.

In another optional embodiment, the pixel data matrix with brightness Y may be used instead of the image data matrix of U and V, and the pixel data matrix of at least one of R, G and B can be only provided. In one example, only one pixel data matrix of U and V can be used.

In the specific implementation process, the target image can be represented by RGB or YUV three-layer data matrix, or the data can be encapsulated into one layer, that is, one layer of data matrix is used to represent the content of three layers, and one unit of multi-bit data unit can be used to express the RGB or YUV combination value of a pixel. The multi-bit data can be such as 24 bit, 32 bit data or even more.

In another implementation process, only monochromatic cameras will be in the sensor fusion implementation, for example, the camera as an image acquisition sensor can only be used for infrared imaging scenes, and the camera can only output monochromatic images. In this case, the multi-dimensional pixel structure mentioned above can still be effective. Specifically, RGB three-layer or YUV-3-layer can be changed to a single-layer brightness Y-data structure, that is, only one-layer brightness Y-data structure can be used; The image data matrix of brightness Y can fuse the data of other sensors to generate a multi-dimensional matrix structure based on the single-layer brightness. The monochrome camera can be a non-color camera, for example, an infrared camera, which can directly capture the gray value of the image and map the data into the single-layer of brightness Y-data.

In any case, the other detection dimension information of the same object that can be captured by other sensors is assembled on the pixel matrix layer of the image data captured by the image acquisition sensor in a hierarchical manner. Then, the pixel of the image can be used as the combination basis of each detection data, and the data is one-to-one corresponding to the pixel.

In specific examples, the camera, as an image acquisition sensor, can arrange the collected image data in three layers according to the RGB colors in an unlimited order to obtain the corresponding image data matrix. For example, the camera resolution is X*Y (for example: 1920*1080, which can correspond to the camera with 1080p resolution); in another example, if the original data input is YUV format, The corresponding image data matrix can also be obtained according to the three-layer arrangement of YUV. In another example, YUV format can be converted to RGB format, which can reduce the association of data in each layer and facilitate subsequent independent feature extraction.

Probe data group can be understood as any data group detected by other sensors except image acquisition sensor. Each data group can be understood as corresponding to a layer of probe matrix layer, and one sensor can generate one or more groups of probe data groups. Different probe data groups are probe data with different detection dimensions, and the different detection dimensions can be understood as: probe data with different physical meanings, or, under the same detection dimension without considering its spatial position, the difference of different probe data lies in the difference of numerical value itself. In the example, the physical units of probe data under the same detection dimension are usually the same, therefore, if the physical units of two probe data are different, they usually belong to different detection dimensions. At the same time, the present embodiment does not exclude exceptions.

In addition, one other sensor may obtain multiple probe data groups of multiple detection dimensions, or one probe data group of one detection dimension.

In one embodiment, the other sensors are at least one of the following: microwave radar, ultrasonic radar, Lidar, and infrared sensor.

The infrared sensor can be used to detect the thermal radiation temperature data, and the microwave radar can detect the target distance, relative velocity, RCS data . . . based on the distance between objects and other mapping relations, the specific implementation mode can further calculate and obtain vector velocity, acceleration, azimuth, etc. Therefore, the probe data can include at least one of the following: range data, velocity data, acceleration data, azimuth data, microwave reflection characteristic data, and thermal radiation temperature data, etc. Further, it can be the change value of the range data, velocity data, acceleration data, azimuth data, RCS data, and thermal radiation temperature data . . . on the characterization of their changes.

At the same time, the above mentioned range data, as well as the velocity data, acceleration data, azimuth data and so on obtained from the range data can also be detected by radar.

The probe data of the other sensors: radar RCS data, in which the RCS can be Radar-Cross Section. It can be further understood as the representation of the change of RCS data of the target object in the detection domain.

It can also be seen from the above description that the probe data mentioned above, whether it is the probe data of other sensors or the probe data of image acquisition sensor such as RGB data, can be directly detected by the sensor, or can be directly detected by the sensor and then indirectly calculated.

In addition, the probe data can also be the intermediate data when the sensor directly generates the detection data, such as the optical flow data of the camera as the image acquisition sensor. Optical flow represents the change of the image. Because it contains the information of the target motion, it can be used by the observer to determine the movement of the target. Optical flow data is the parameter of pixel relationship derivation processing between continuous image frames of camera as image acquisition sensor, which can be two-dimensional vector (X, Y direction). Therefore, in this embodiment, the optical flow data of the current pixel corresponding to the preceding frame can be added. Correspondingly, an optical flow data matrix can be added to the image data matrix, and then more data dimensions can be added for the data organization of the system for subsequent data comprehensive processing.

The intermediate data mentioned above can also be used for example, the calculated three-dimensional vector velocity, that is, the vector data of motion speed, etc. Specifically, in some scenes, it is necessary to accurately record the motion speed of the target object. In order to increase the accuracy, it can be represented by vector velocity instead of relative velocity. In this case, we can use the system to calculate the X/Y/Z axis of the target vector velocity data in the three-dimensional space or the corresponding spherical coordinate system ($\rho$, $\varphi$, $\theta$) and so on. Furthermore, the velocity data can correspond to three layers of probe matrix layer, corresponding to three components representing X, Y and Z, or three components of $\rho$, $\varphi$ and $\theta$. Furthermore, the multi-dimensional matrix structure involved in the present embodiment can also record the vector value of the moving speed of the target object.

Therefore, the velocity data mentioned above can be the vector component of the motion velocity or the velocity value.

It can be seen that any data detected by the sensor that can be distributed in two dimensions can be understood as the probe data mentioned above, that is, they do not deviate from the scope described in the embodiment.

In addition, for example, the image acquisition sensor of a camera can specifically be a sensor that can sense the texture (shape, contour, light, dark, etc.) and color of the target object, and record the instantaneous image information. The camera can also record video information, string the recorded events with time axis to form a video stream, which can be used for event playback and time related event analysis.

The infrared sensor mentioned above can also be understood as an image acquisition sensor. Therefore, the infrared sensor can be used as the image acquisition sensor mentioned above, and can also be used as a kind of other sensors, which can capture the infrared radiation information of the target and save it in the format of pictures and videos.

The above-mentioned microwave radar can capture the relative distance, relative velocity and RCS data of the target, and quantitatively express the thermal map, relative distance, relative velocity of the target object, RCS data dimension of the radar cross section of the target, or output the point cloud data.

The Lidar mentioned above mainly outputs the point cloud data of the target by detecting the spatial position (relative distance, spatial angle, position and coordinate information) of the target object.

Since Lidar usually outputs point cloud data structure: gray pixel point cloud data (X1, Y1, Z1, Gray Value 1), or color point cloud data (X1, Y1, Z1, R1, G1, B1), the data of these four or six layers can be combined to the target point, and mapped to the corresponding position of the matrix layer according to the spatial sampling projection model of the image captured by the optical camera.

It can be seen that all kinds of sensors have their own information perception dimensions. For example, the camera commonly used in the field can capture the image information of the target and record the texture and color information of the environment and target at the moment of shooting vividly. However, it may be impossible to accurately extract the distance and speed information of the target from a single image, and it is difficult to predict the event from a traditional photo what will happen in a moment. However, the way of video will bring huge amount of data, as well as the demand of large transmission bandwidth and storage space. The recording methods of other sensors, such as radar, ultrasonic and Lidar, can record the information of their own sensing dimensions, such as the distance and speed of the target; but when we are going to use the data information recorded by them and the current recording method (data structure) for comprehensively describe the characteristics of the target and directly used for environmental perception and event prediction, the dimension and integrity of data by current existed sensor fusion methodologies are insufficient. How to organize the data information collected by these different kinds of sensors in a unified time and space axis and record and save them efficiently, there is no universal and feasible method in the existing related technologies. Therefore, we create this invention, the method involved in the embodiment can conduct efficient multi-layer data fusion for various collected data, and make full use of the information combination from different dimensions to support more diverse and effective information sampling and preservation for target feature extraction and data analysis.

S12: Form a multi-dimensional matrix structure.

In addition, after the multi-dimensional matrix structure is formed, time stamp can be added to the structure to record the sampling time, which is conducive to the implementation of multi-dimensional information data collection and storage of environment and target.

The multi-dimensional matrix structure includes a plurality of matrix layers distributed longitudinally, and the plurality of matrix layers includes at least one pixel matrix layer and at least one probe matrix layer. Each probe data element in the probe data group vertically corresponds to the pixel elements in the pixel matrix layer, which can be one-to-one, one-to-many or many to one. It can be seen that a single probe data matrix can vertically correspond to a single pixel element, or vertically correspond to an area range containing a plurality of pixel elements.

It can be seen that the method in this embodiment increases the depth of system perception and establishes an array structure of multi-dimensional depth perception with pixels as granularity—to be multi-dimensional matrix structure. In short, the present embodiment can extend each pixel in the related technologies to each multi-dimensional data structure, that is, the present embodiment combines the probe data in different dimensions in the form of matrix array to form a multi-dimensional matrix structure.

In this embodiment, the multi-dimensional matrix structure can be used to represent the mapping result between the probe data and the pixel, and other description methods can be used to characterize the mapping result between the probe data and the pixel, such as semantic description, table, etc.

Figure 2:
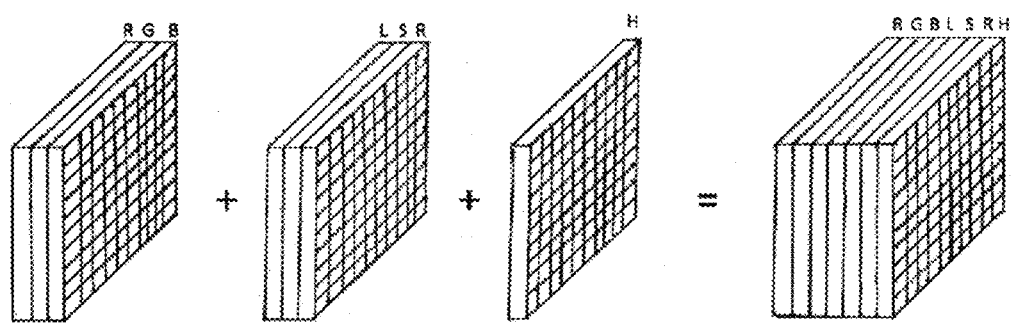
FIG. 2 is the example 1 in the invention—A schematic diagram of forming multidimensional matrix structure.
Figure 3:
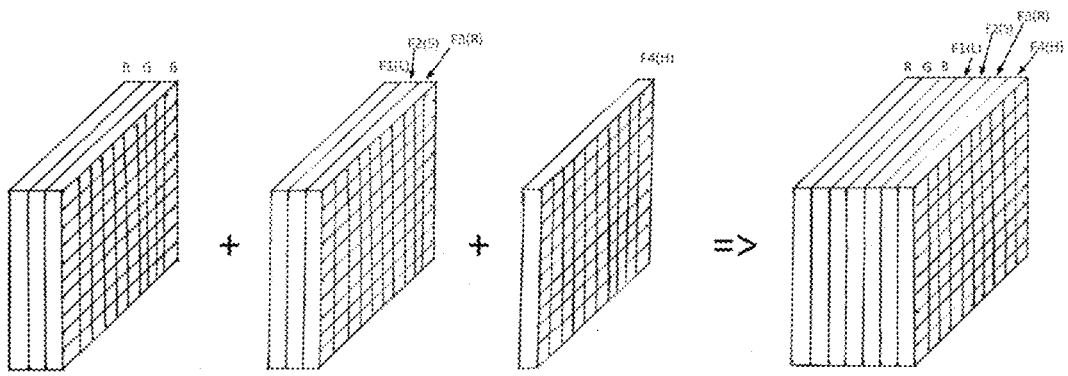
FIG. 3 is the example 1 in the invention —Another schematic diagram of forming multidimensional matrix structure.
Figure 4:
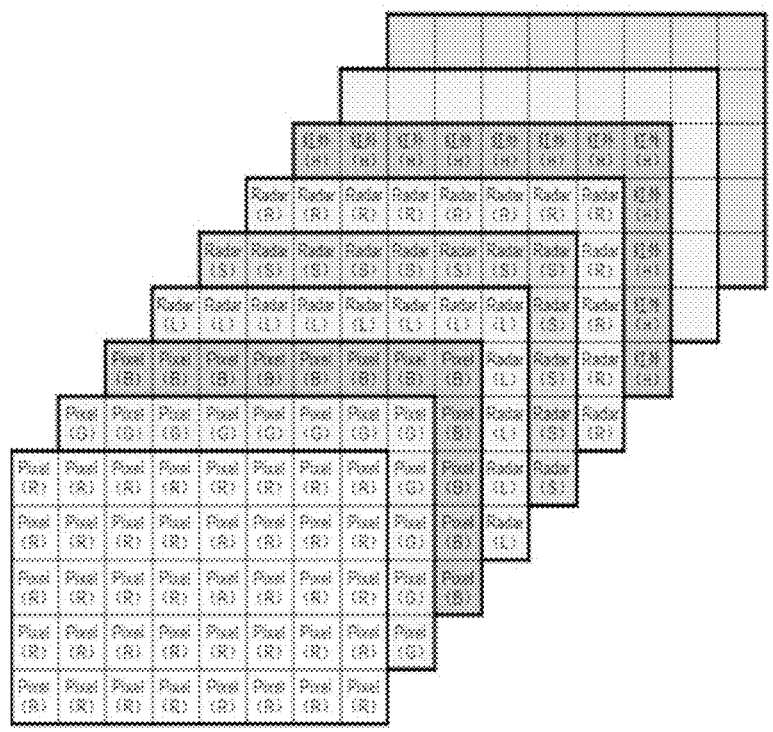
FIG. 4 is the example 1 in the invention—One more schematic diagram of forming multidimensional matrix structure.
Figure 5:
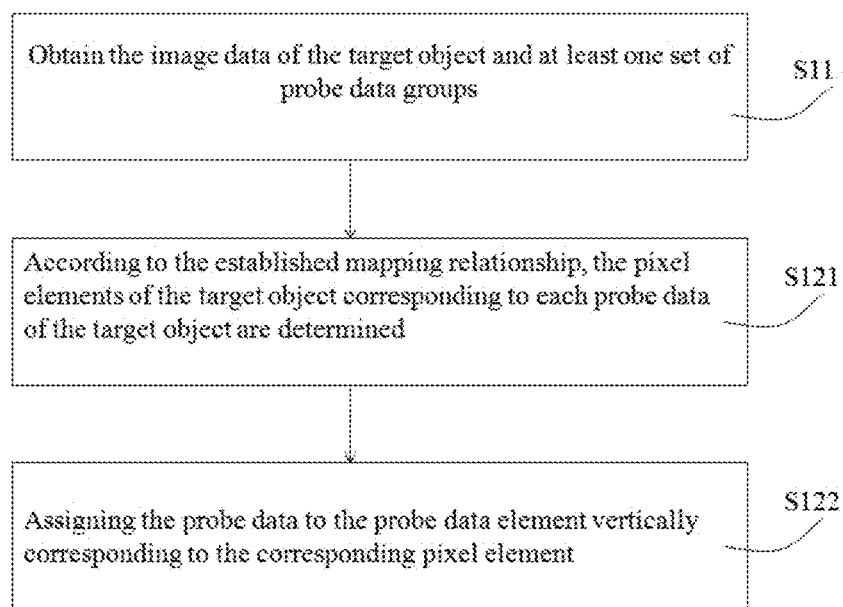
FIG. 5 is the example 1 in the invention —Another flow chart of data processing method of multi-sensor fusion.

FIG. 2 is the example 1 in the invention—A schematic diagram of forming multidimensional matrix structure; FIG. 3 is the example 1 in the invention—Another schematic diagram of forming multidimensional matrix structure; FIG. 4 is the example 1 in the invention—One more schematic diagram of forming multidimensional matrix structure;

In this embodiment, each pixel matrix layer is corresponding to represent a pixel data matrix, wherein, the pixel matrix layer can be the pixel data matrix itself, such as RGB three-layer or YUV three-layer, etc. taking the embodiments shown in FIG. 2 to FIG. 4 as an example, it can be interpreted as the three-layer data structure on the left in FIG. 3 and FIG. 4, it can also be specifically understood as the top three data structures in FIG. 5. In other alternative embodiments, the pixel matrix layer may also be other matrix layers generated from the pixel data matrix, such as other matrix layers generated after interpolation or conversion of the pixel data matrix.

The combination of image acquisition sensor+radar+infrared sensor is specifically used in FIG. 2 to FIG. 4, which is only a combination of examples. Other sensors can be added or some sensors can be removed in the optional scheme of the embodiment, and the working principle is consistent.

In the present embodiment, each probe matrix layer is used to represent a set of probe data groups, and the values of the probe data elements are determined according to the value assignment of the detection data.

Therefore, the data elements at each position of each matrix layer in the multidimensional matrix structure can also be characterized by the cross-sectional coordinates (x, y) of the multidimensional matrix structure. It can be seen that the "vertical" direction involved in the context can be understood as the distribution direction between the matrix layers, and the "horizontal" direction involved in the context can be understood as the distribution direction of the elements in a single matrix.

Taking FIG. 2 and FIG. 4 as examples, the probe matrix layer of layer L can be understood as the probe matrix layer representing the range data detected by radar, and the probe matrix layer of layer S can be understood as the probe matrix layer representing the velocity data detected by radar, and the probe matrix layer of layer R can be understood as the probe matrix layer representing the RCS data involved above, and the sensing of layer H can be understood as the probe matrix layer of the thermal radiation temperature data detected by the infrared sensor.

It can be seen that in one embodiment, the value of the probe data element is the corresponding probe data itself, which can be specifically understood as the value of the probe data element is determined by the direct assignment of the corresponding detection data.

In another embodiment, the value of the probe data element can also be determined according to the corresponding probe data conversion, which can be specifically understood as the value of the probe data element can also be determined by the value assignment determined by conversion.

For example, for the probe matrix layer of R layer, the corresponding value of RCS mapped to radar received power P can be input. Then, the RCS value corresponding to the cross-section coordinate position of corresponding multidimensional matrix structure as (x, y) can be calculated as follows: $P(x,y)=RCS(x, y)/(L(x, y)^4)$;

Among them:

RCS (x, y) refers to the RCS value corresponding to the cross-section coordinate position of (x, y);

L (x, y) refers to the relative distance of the target detected by radar.

Furthermore, the converted P (x, y) can be used to map data.

It can be seen that the value determined by this conversion can be determined by conversion of single probe data or by conversion of multiple different detection data.

In the embodiment shown in FIG. 3, the value assigned by each data element in F1 (L) can be understood as the value after functional conversion of the range data L detected by the radar; the value assigned by each data element in F2 (S) can be understood as the value after functional conversion of the speed data S detected by the radar; and the value assigned by each data element in F3 (R) can be understood as the value after function conversion of RCS data detected by radar; the value assigned by each data element in F4 (H) can be understood as the value after function conversion of thermal radiation temperature data detected by infrared sensor.

The conversion involved in the optional scheme of the embodiment can also be implemented only for part of the detection data, but not limited to as shown in FIG. 3.

In addition, the assignment mentioned above is mainly for the part of the target object in the detection domain, that is, the assignment itself can also be represented as the detection result of the target object. It can also be seen that the multi-dimensional matrix structure involved in the present embodiment and its alternatives can be used for target detection and related environmental awareness.

FIG. 5 is the example 1 in the invention—Another flow chart of data processing method of multi-sensor fusion.

Referring to FIG. 5, in this embodiment, step S12 may include:

S121: according to the established mapping relationship, the pixel elements of the target object corresponding to each probe data of the target object are determined.

The process of determining the pixel elements of the target object can be the process of obtaining the target pixel information, which can be understood as representing the pixel corresponding to the detection data. In the specific implementation process, the cross-section coordinates, such as (x, y) represented above, can be used to represent the target pixel information, or arbitrary preset identification information can be used to represent the target pixel information.

Since the pixel matrix layer represents the pixel data matrix, and the pixel data matrix itself represents the pixels, therein, when forming the multi-dimensional matrix structure in the embodiment, only the mapping relationship is needed to determine the corresponding pixel element.

The mapping relationship can be understood as the mapping relationship between the probe data at different positions of different detection dimensions in the detection domain of the other sensors and different pixel elements. The mapping relationship can be represented by any data structure, such as in the form of tables or statement.

In one embodiment, the mapping relationship is specifically used to represent the corresponding relationship between the probe data at different positions of different detection dimensions in the detection domain of the sensor and different single pixel elements.

Figure 6:
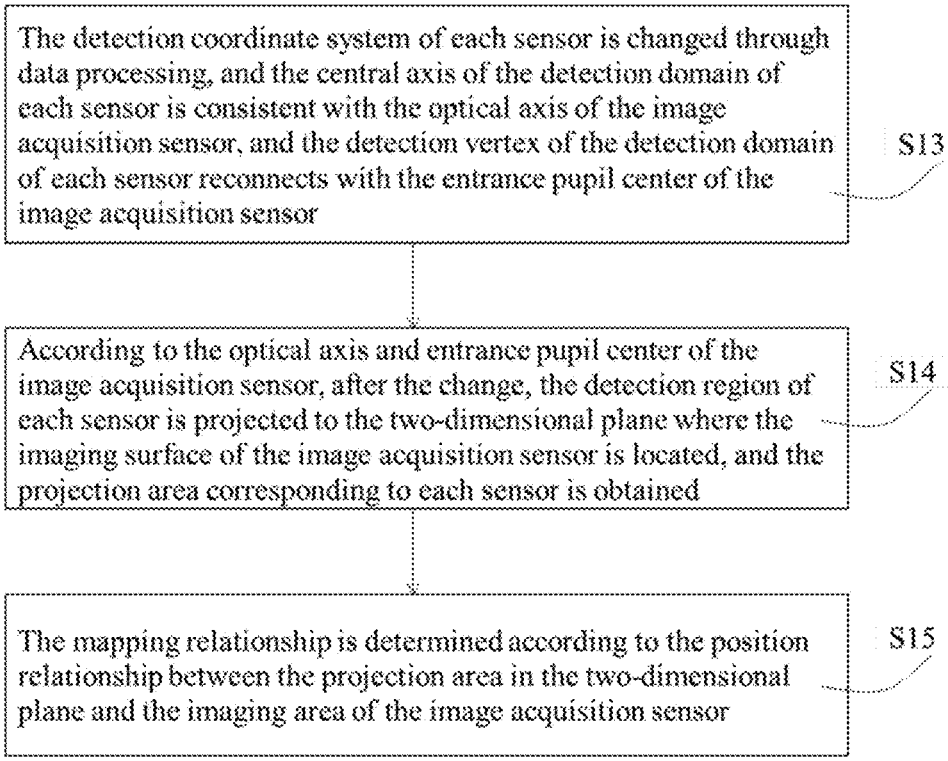
FIG. 6 is the example 1 in the invention—The flow chart of mapping relationship establishment.
Figure 9:
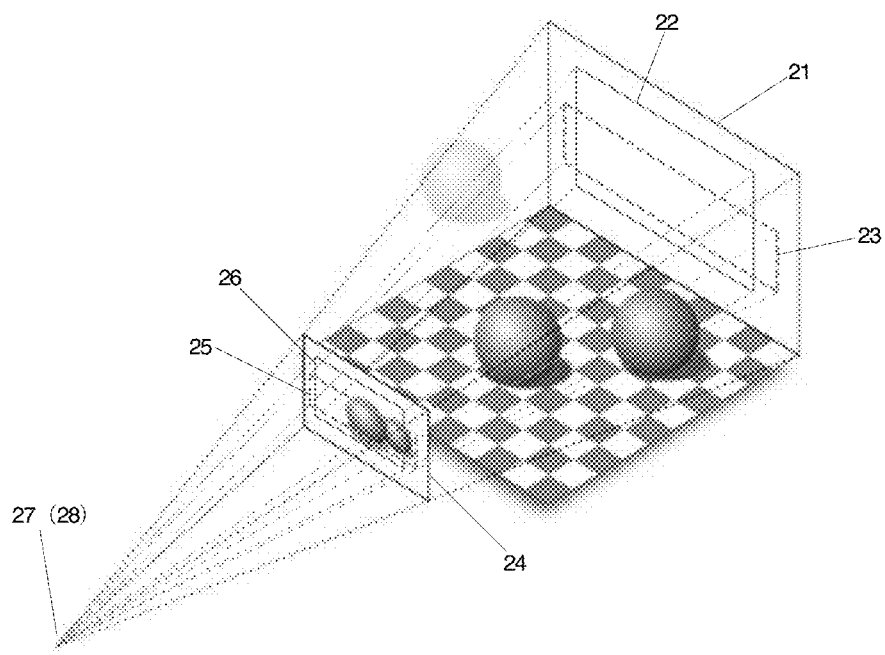
FIG. 9 is the example in the invention—Schematic diagram of projection.
Figure 10:
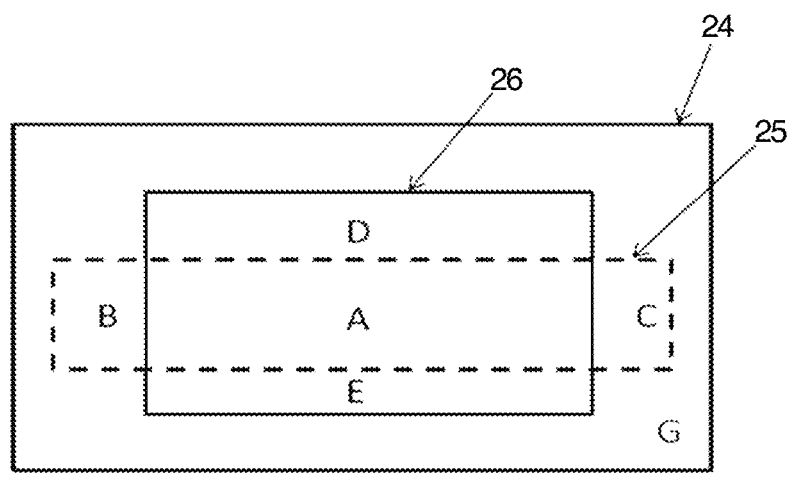
FIG. 10 is the example in the invention—Schematic diagram of imaging surface.

FIG. 6 is the example 1 in the invention—The flow chart of mapping relationship establishment; FIG. 9 is the example in the invention—Schematic diagram of projection; FIG. 10 is the example in the invention—Schematic diagram of imaging surface;

Referring to FIG. 6, the process of establishing the mapping relationship includes:

S13: the detection coordinate system of each sensor is changed through data processing, and the central axis of the detection domain of each sensor is consistent with the optical axis of the image acquisition sensor, and the detection vertex of the detection domain of each sensor reconnects with the entrance pupil center of the image acquisition sensor.

Among them, the entrance pupil center 27 according to the conventional principle of the image acquisition sensor of the camera, will be coincided in the same position of the detection vertex 28, the detection vertex 28 can also be understood as the detection origin of the other sensors.

Through the above steps, we can unify the detection domain and transform the mapping relationship of the multi-sensor combination into the three-dimensional detection space of the image acquisition sensor (such as the camera) through the spatial coordinate transformation, so as to realize the projection based on the detection direction and detection space of the image acquisition sensor, and then establish the required mapping relationship. The changes can be, for example, translation, rotation and scaling of the coordinate system.

In one embodiment, the detection coordinate system can be a rectangular coordinate system, and then it can have mutually perpendicular X-axis, Y-axis and z-axis. Furthermore, in the standard three-dimensional Euclidean geometry space, the detection domains of each sensor (the physical space area of data detection and collection) can be related by the translation and rotation of their respective coordinate systems. In other words, through the above step S13, the unified detection space and common detection angle of the system are established.

In the specific implementation process, since the space position of each sensor may be different, the optional scheme of the embodiment can calculate the central axis (X'/Y'/Z' axis) of each sensor's respective detection domain (respective detection space) through the space parameters of the sensor installation, and then implement the above step S13 based on this.

In one example, because the real system often has product tolerance and installation error, the optional scheme of the embodiment can also detect the central axis of each sensor's detection domain in combination with the geometric calibration process. In order to calibrate the central axis, targets can be placed at multiple positions to determine the space position coordinates, and then the positions of these targets measured by the sensor data input, the corresponding relationship between the target position reading and their physical space position in reality is established, so as to establish the spatial correspondence (or mapping) between the coordinate reading of the target space detected by the sensor and the actual geometric space position.

In another embodiment, the detection coordinate system can also be a spherical coordinate system. In other words, we can also use the spherical coordinate system to associate the detection domains of each sensor to establish a one-to-one correspondence relationship.

For example, in the coordinates ($\rho$, $\varphi$, $\theta$) of a spherical coordinate system, there are three-dimensional variables, where:

$\rho$ can be understood as the distance between the target and the axis of the coordinate system;

$\varphi$ can be understood as the angle of the target relative to the Z axis;

$\theta$ can be understood as the angle of the target relative to the X-axis.

Then, the origin of spherical coordinates, such as the entrance pupil center mentioned above, can be understood as the spatial mapping relationship of the target object in the radial direction to the spherical coordinate origin.

Figure 7:
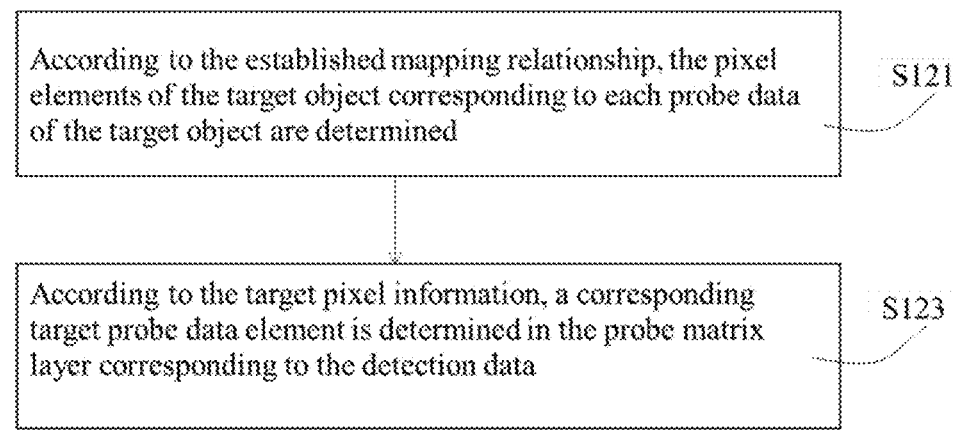
FIG. 7 is the example 1 in the invention—the diagram of Step S121 and Step S123 flow chart.

Specifically, the Euclidean solid coordinates and spherical coordinates can be transformed each other, and the transformation relationship can be characterized as follows:

$x = \rho \sin \varphi \cos \theta$ $y = \rho \sin \varphi \cos \theta$ $z = \rho \cos \varphi$ In one of the embodiments, after the change, the detection domain 21 of the image acquisition sensor and the detection domain of other sensors can be expressed by the position relationship in a reference plane in FIG. 7. Specifically, the detection domain 22 can be understood as the detection domain of an infrared sensor, and the infrared sensor can be specifically an infrared thermal imager, and the corresponding probe data may be, for example, thermal radiation Temperature data; the detection domain 23 can be understood as the detection domain of radar.

S14: according to the optical axis and entrance pupil center of the image acquisition sensor, after the change, the detection region of each sensor is projected to the two-dimensional plane where the imaging surface of the image acquisition sensor is located, and the projection area corresponding to each sensor is obtained.

Referring to FIG. 10, the detection area 21 of the image acquisition sensor can be projected on the imaging surface to form an imaging area 24, that is, the projection area of the image acquisition sensor can also be characterized as the imaging area; after projection, the detection region of other sensors can be projected to the imaging surface 24 to form a projection area, for example, the detection area 22 of the infrared sensor projects the projection area 26; The projection area 25 can be obtained by projecting the detection region 23 from the Radar sensor detected area.

Each projection area may be in the imaging region 24. In other optional embodiments, the present embodiment does not exclude that the projection area may be partially outside the imaging region 24.

S15: the mapping relationship is determined according to the position relationship between the projection area in the two-dimensional plane and the imaging area of the image acquisition sensor.

Specifically, the mapping relationship can be determined according to the projection relationship between the projection area of the sensor and the current detection region, and the position relationship between the projection area in the two-dimensional plane and the imaging area of the image acquisition sensor.

Through the changes and projections mentioned above, the detection domain can be unified into the same plane, thus facilitating the characterization and determination of the mapping relationship between the location points.

In the specific implementation process, if the detection domain of other sensors is changed, in step S15, the mapping relationship can also be determined in combination with the corresponding relationship of each position of the detection domain before and after the change, that is, according to the projection relationship between the projection area of the sensor and the current detection domain, the corresponding relationship of the detection domain before-and-after the change and the projection area in the two-dimensional plane, the mapping relationship is determined by the position relationship between the domain and the imaging area of the image acquisition sensor.

After step S121, it can include: S122: assigning the probe data to the probe data element vertically corresponding to the corresponding pixel element.

FIG. 7 is a flow diagram of step S121 and step S123 in embodiment 1 of the present invention.

If the target pixel information is obtained in the previous step S121, after step S121, refer to FIG. 7, which may include:

S123: according to the target pixel information, a corresponding target probe data element is determined in the probe matrix layer corresponding to the detection data.

The target probe data element may be represented, for example, as a specific (x, y) coordinate in a particular probe matrix layer.

Due to the target probe data element determined in step S123, in step S122, the target probe data element corresponding to the target probe data element is assigned according to the detection data.

After the assignment, it can be understood that the detection result of the target object can be displayed by the result of assignment, which can be further suitable for recognition.

Figure 8:
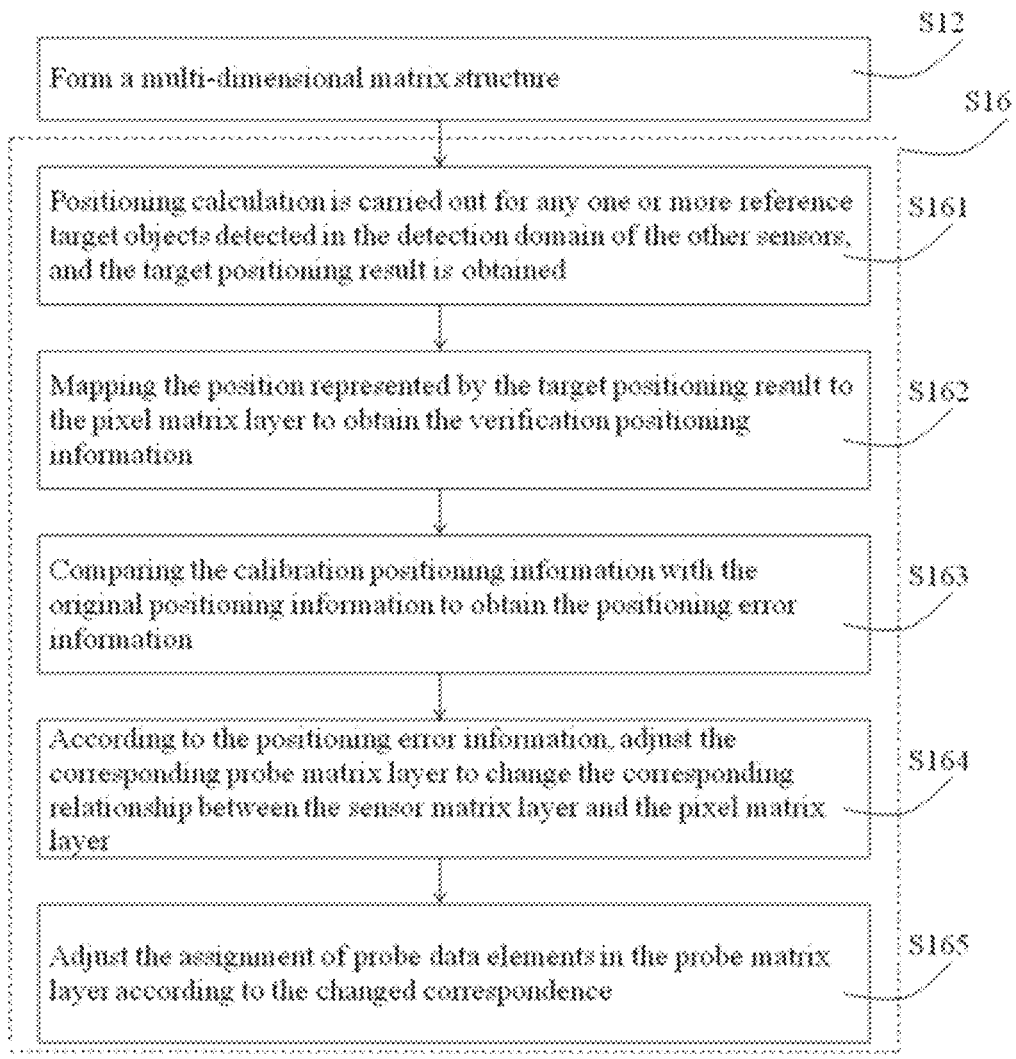
FIG. 8 is the example 1 in the invention—The diagram of Step S16 flow chart.

FIG. 8 is the example 1 in the invention—The diagram of Step S16 flow chart.

In one embodiment, when establishing the mapping relationship, the algorithm can be used to adjust the geometric space mapping relationship to reduce the geometric mapping positioning error. Specifically, after step S12, the following step S16 can be implemented, specifically including:

S161: positioning calculation is carried out for any one or more reference target objects detected in the detection domain of the other sensors, and the target positioning result is obtained; the target positioning result is used to represent the position of the reference target object in the detection space;

S162: mapping the position represented by the target positioning result to the pixel matrix layer to obtain the verification positioning information;

S163: comparing the calibration positioning information with the original positioning information to obtain the positioning error information; the original positioning information is used to represent the position of the pixel elements determined in the pixel matrix layer when the multi-dimensional matrix structure is formed for the same reference target object;

S164: according to the positioning error information, adjust the corresponding probe matrix layer to change the corresponding relationship between the sensor matrix layer and the pixel matrix layer;

S165: adjust the assignment of probe data elements in the probe matrix layer according to the changed correspondence.

Specifically, multiple detected target objects in the detection domain are calculated independently in their respective sensor detection space area, and the final positioning results are matched into the multi-dimensional matrix structure. Then the matching results are compared with the detection results of the same target object in step S12 to determine the position error of the same target object. Specifically, the method of geometric space transformation can be used to calculate the error; Furthermore, the vertical correspondence between the data elements in the sensor matrix layer and the data elements in the pixel matrix layer can be adjusted by scaling and shifting the relative positions of the corresponding sensor matrix layer and pixel matrix layer; It can also be understood as adjusting the corresponding relationship between data elements and pixels in the probe matrix layer to reduce the error, and, the mapping relationship determined by S13 to S15 can be adjusted accordingly as well.

In the above embodiment, the target object can be represented again in the probe matrix layer by positioning detection of the target object and directly mapping the location detection result to the corresponding probe matrix layer without using the established mapping relationship, which should be consistent with the target object shown by assignment in step S12; Furthermore, the above-mentioned errors can be represented by comparing the differences between the two, so as to effectively adjust the detection results of the target object and adjust the established mapping relationship.

It can further reduce the mapping error caused by the geometric space transformation of different axes, and make the combination of data structures more accurate.

In practical application, each sensor should be installed as close to the coaxial line as possible in the spatial structure—the closer the sensor is, the better the mapping error caused by the geometric space transformation of different axes can be reduced (the result is similar to virtual image).

In addition, since the spatial angle resolution of the radar and infrared sensor and the image acquisition sensor may be different at the initial input, that is, the resolution of the other sensors does not match the resolution of the image acquisition sensor, in the optional scheme of the present embodiment, the resolution can also be matched (scaled) to ensure that the probe data elements in each sensor matrix layer can be matched—be able to map the image data elements in the prime matrix layer one-by-one correspondingly.

The inconsistency of the above resolutions can be interpreted as that the row and column distribution of the probe data of other sensors is inconsistent with that of the pixels in the imaging plane of the image acquisition sensor within the same size range after being projected onto the two-dimensional plane of the imaging plane. For example, the number of rows and/or the number of columns are not consistent, it can also mean that the row and column distribution of data is inconsistent with that of pixels in the imaging plane in the same size range after the probe data are processed by conversion, calculation and so on.

In order to realize the matching, in one embodiment, the macroblock can be defined through the pixel plane to realize the matching. Furthermore, the mapping relationship is specifically used to characterize the corresponding relationship between the probe data at different positions in the detection domain of the sensor and different macroblocks, and the macroblock comprises at least two pixels.

In the specific implementation process, the image can be divided into pre-defined macroblocks and then matched with the data detected by low-resolution sensors in one-to-one mapping relationship. Of course, the specific definition parameters of macroblocks need to be specified in the data organization, for example, in the data file header or description.

In order to realize the matching, in another embodiment, it can also be realized by interpolation. For example, the data elements in the probe matrix layer also include a first interpolation data element, and/or the data elements in the pixel matrix layer also include a second interpolation data element. The values of these interpolation data elements can be understood as determined by interpolation.

Taking the probe data detected by radar as an example, the radar probe data is converted into dense image like data with tensor structure, which can be used as a probe data group, and then the radar detection area is projected to the two-dimensional plane of the imaging surface by using the geometric projection method, which can be used as the projection surface of the target object detected by the radar; The resolution of the camera and the data acquisition system can be matched point by point; The target detected by radar can be projected onto the projection plane to generate the radar probe matrix structure of radar detection data; The data layer of radar perception matrix can include L (target distance value) layer, S (relative velocity value) layer and R (radar cross section value) layer; similarly, the order of these layers can be interactive or flexibly combined, and L, S and R can be activated completely, or only one or two of them can be selectively activated (corresponding to form one or more probe matrix layers); At present, the spatial resolution of millimeter wave radar is relatively low, and the angular resolution of the target is not high, as a result, its projection on the two-dimensional mapping surface of the target will have a large possible coverage area—the radar "pixel" size is larger than that of image acquisition sensor (Radar in low resolution), we need to interpolate the radar data in its projection surface in order to assign values to the data elements in each sensor matrix layer of each multi-dimensional pixel, therefore, the matching sensor matrix layer can have interpolation data elements; Since the radar data is sparse, in the radar data structure (L layer, S layer, R layer, etc.), the radar data will be assigned one by one corresponding to the area where the radar has detected the target object (equivalent pixel position), however, in the area where no target is detected by radar, the original radar data corresponding to these areas can be assigned as "0", or set as the by-default data generated by pre-setting of system, to ensure that each data element in the sensor matrix layer corresponding to radar data is assigned.

If other sensor is infrared thermal imager, the image data collected is also in pixels. The resolution of the image can be amplified by appropriate interpolation, and then the resolution of the camera can be matched. The image collected by the infrared thermal imager (generally black and white brightness pixel information) is assigned to the corresponding probe matrix layer point by point. In general, the resolution of infrared thermal imager is lower than that of ordinary camera.

In addition, this embodiment does not exclude the situation that the resolution of other sensors is higher than that of image sensor, for example, the image resolution of infrared thermal imager is higher than that of camera installed in the system. In this case, in addition to the scheme of interpolation of pixel matrix layer, the resolution of thermal imager can also be reduced; in short, the basic principle is through the sensor image scaling to make sure their resolution to be equally, then, the data elements of the corresponding matrix layer of the multidimensional matrix structure can be all assigned the data mapped one-by-one.

For similar reasons, the data elements in the pixel matrix layer can also be interpolated.

The interpolation mentioned above can be used for example: nearest neighbor interpolation, bilinear interpolation, cubic convolution method, etc.

In one embodiment, the matrix layer in the multi-dimensional matrix structure can be selectively activated. The activation can be understood as that the matrix layer can only be used when it is activated, and the data of the matrix layer will be updated and iterated. At the same time, the matrix layer can be written in the pre-written program, and then, it can be activated or not activated. The matrix layer can also be added later, or it can be generated automatically according to the pre-defined rules.

As mentioned above, the other sensors are at least one of the following: microwave radar, ultrasonic radar, Lidar, infrared sensor, and terahertz image sensor; the probe data of the other sensors include at least one of the following: distance data, velocity data, acceleration data, azimuth data, radar RCS data, and thermal radiation temperature data; The image data matrix includes at least one of the following: luminance data matrix, RGB three-layer data matrix, YUV three-layer data matrix, and optical flow data matrix.

According to the different scenarios with the different sensors to be applied/activated, the existing matrix layer and the activated matrix layer can be changed.

For example: in the specific example, the camera can be used as the image acquisition sensor, the microwave radar and the infrared thermal imager are used as other sensors respectively. The camera outputs color images (RGB or YUV data), and the microwave radar outputs the range data, relative velocity data, azimuth data and RCS data of the target object, and infrared thermal imaging outputs the thermal radiation temperature distribution image of the target in which each pixel can be understood as the thermal radiation temperature data. The combination of the examples can sense and detect the target from multiple dimensions, and can work effectively under various working conditions (day, night, fog, rain and other harsh environment).

In specific examples, multiple sensors can be combined flexibly. For example, all three sensors can be used (camera+microwave radar+infrared thermal imager), or in pairs: camera plus microwave radar, camera plus infrared thermal imager, or combination of microwave radar and infrared thermal imager. Because the multi-dimensional target probe data are combined in the form of multi-dimensional matrix structure, the system can dynamically adjust the dimension of sensor input parameters for target recognition according to hardware configuration or scene (under different working conditions such as daytime, night, etc.), that is, adjusting the activated matrix layer and using the subset of multi-dimensional pixels for object detection. For example: in the night driving, we want to detect the target beyond the lighting range of the car lamp, we can only activate the sensor matrix layer of radar input matrix and the sensor matrix layer of infrared thermal imager input matrix. A sensor can also be added or removed dynamically in the way of dynamic hardware configuration. In any way, the method involved in this embodiment can keep working, that is, the system can still keep working.

The flexible combination can also have the following positive effects: in a certain scenario, if one of the sensors of the system fails (or is damaged), the method involved in the embodiment and the system implementing the method can still maintain effective operation by adjusting, thus enhancing the robustness of the system operation. In some applications, such as ADAS or autopilot, it is necessary to increase the robustness of the system.

In addition, for the combination of multiple sensors, the number of similar sensors can also be flexibly configured, for example, multiple cameras, multiple radars, and multiple thermal imagers can be used. On the basis of the combination of "camera+millimeter wave radar+infrared thermal imager", other kinds of sensors can be introduced, such as Lidar, etc. the detection parameters brought by the new sensors can also be added to the multi-dimensional matrix structure of our "camera+millimeter wave radar+infrared thermal imager" system to be the part of multi-dimensional data.

No matter what kind of combination, the target can be detected, classified and recognized beyond the detection dimension of a single sensor, and the system can have higher target detection rate and better recognition ability and recognition quality.

Because the detection field of each sensor may be different, the mapping relationship between them may overlap. As shown in FIG. 10, the marked class A area is the area jointly detected by three kinds of sensors, the marked class B area and the class C area are the areas jointly detected by the radar and the camera, the marked class D and E areas are the areas jointly detected by the camera and the infrared thermal imager, and the class G area is the area only detected by the camera.

Among them, class A area is the area explored by three kinds of sensors. This area can make the most of the accurate detection of multi-dimensional data brought by multi-sensors fusion, so the sensor fusion in this area could be more demanding. The detection dimensions of camera and radar are very complementary in overlapping detection areas, such as class B area and class C area, the fusion of these two sensors is also more important. Another important fusion area is the area where the camera and the infrared thermal imager overlap. In this area, the infrared thermal imager can make up for the deficiencies of the camera under the working conditions of night and fog. However, since both of them produce image information, the information fusion between them needs the resolution matching process mentioned above in this paper, such as image interpolation—the infrared sensor image resolution (pixel number) is enlarged or the camera image resolution is reduced to achieve mutual matching. Then, the infrared sensor image (we mark as H dimension) is combined with the RGB (or YUV) of the camera to form the required multi-dimensional matrix structure.

After step S12, the optional scheme of the embodiment can analyze and process the matrix layer of each layer by discrete-value+classifier methods to detect the target object; the neural network method can be used for subsequent detection processing; or the two methods can be mixed for processing. Actually other object detection algorithm can also be used based on our data structure. In either way, since the embodiment unifies the multi-dimensional detection information into a data structure, and maps and combines the pixel as a unit, such deep fusion data combination can effectively improve the object detection quality.

Among them, for the neural network, because the input is a multi-dimensional matrix structure, the network will generate more layer feature map, and have more rich multi-layer and multi-dimensional feature extraction, which is conducive to target detection and location with more efficient and high-quality. The multi-dimensional matrix matching algorithm has better matching. The current popular neural network algorithms, such as R-CNN, faster R-CNN, SSD, etc., can be matched and applied to the application of multi-dimensional matrix structure involved in this embodiment.

For the detection of the target object, if the machine learning method is adopted in this embodiment, it will involve the collection of target samples and the training of the system. The matrix description method of multi-dimensional measurement parameters involved in the embodiment can facilitate the sample collection and training of the target object; the information of each matrix layer is relatively independent, and the structure of each layer can be increased or decreased, and one or more layers of the matrix layer can be dynamically activated (the information of these layers participates in the determination and description of the target) or not in the subsequent processing (The information of these layers does not participate in the determination and description of the target), but it does not hinder the detection and marking of the target with multi-dimensional pixel structure. We suggest that all matrix array layers of multi-dimensional pixels should be activated when the target sample is collected. However, the activation of the specific matrix array layer can be dynamically combined according to the specific scene (day, night, overlapping state of sensor detection field, etc.) to match the corresponding scene. For the multi-sensor detection area, we can use the multi-dimensional matrix structure to organically combine them, and use the same processing algorithm framework to detect the target; their training methods (including the collection of data samples) can also be fused together and realized at one time.

This embodiment uses multi-sensor to identify the target from multiple detection dimensions. This multi-dimensional matrix structure can organically combine the multi-dimensional sensing detection data, and brings great convenience to the subsequent data processing (whether using the traditional classifier method, or the neural network method, or a combination of the two, or the other machine learning & AI method), as well as the sampling of training samples. This kind of data assembly is also very effective for spatial navigation and positioning (such as SLAM). Specifically, the description of the target object using this structure not only has the feature data (used for classification and recognition), but also has the three-dimensional position space information (the spatial angle on the XY axis and the distance between the detector and the target). The result of target recognition can be directly used for spatial positioning.

In the optional scheme of the embodiment, the combination of information from different dimensions produces more diverse and effective data mining and feature extraction potentials, which not only provide a more efficient event recording method (format), but also improve the system environment perception and target detection ability, and greatly saves the bandwidth required for data transmission and data storage space. At the same time, the system (processing unit) can be effectively reducing the cost to do event prediction and analysis.

Since this method can contain the relative distance and speed information of the target in the multi-dimensional matrix structure, the intention description of the target and the scene analysis of the predicted event can be made in the data corresponding to just one frame of pixels based on our multidimensional matrix structure data.

Therefore, the method involved in this embodiment and its options can be applied to automotive vehicle driving assistance system (ADAS) and autonomous driving system, robot, AGV, and various equipment and systems that need the ability of environmental sensing and target detection.

If the method involved in the implementation is applied to machine learning, since machine learning needs a large number of sample sets, these sample sets also need to be customized for their own multi-sensor combination system. The data organization method of the invention can be much targeted for the specific combined multi-sensor system to collect rich and effective data samples, which is very suitable for multi-sensor fusion machine learning training sample collection. In addition, the storage space is greatly saved. When the machine learning system involves "cloud"+"end" or "edge computing", it is necessary to transfer the system sampling data locally and in the cloud. The method involved in this alternative scheme can achieve more efficient transmission of multi-dimensional information and avoid unnecessary redundant data occupying data transmission band width; In addition, in some specific fields (such as security, monitoring, insurance Forensics), the system requires as little storage space as possible to save as much information as possible. The data sampling and storage method of this invention can store multi-dimensional target information on a frame of data matrix (including the information of target distance and running speed vector), which can be greatly helpful to forensic information usage applications.

Figure 11:
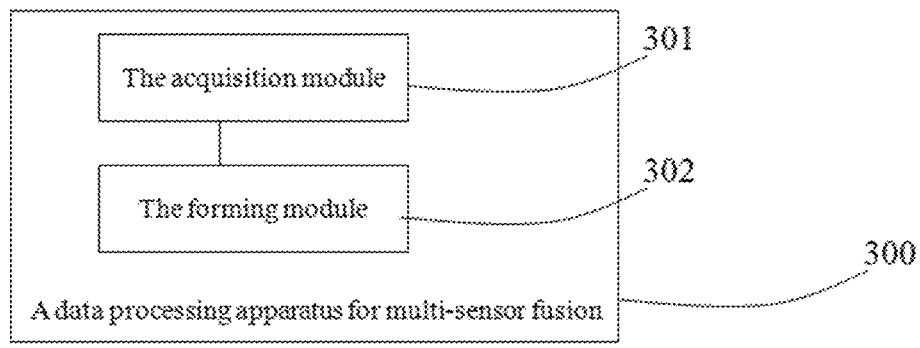
FIG. 11 is the example 1 in the invention—Structure diagram of data processing device for multi-sensor fusion.

FIG. 11 is the example 1 in the invention—Structure diagram of data processing device for multi-sensor fusion.

Referring to FIG. 11, a data processing apparatus 300 for multi-sensor fusion includes:

The acquisition module 301 is used to obtain the image data of the target object and at least one set of probe data group; the image data is detected by the image acquisition sensor, and the probe data group is detected by other sensors; the image data is used to characterize the target image collected by the image acquisition sensor by using at least one image data matrix; the different probe data groups are the probe data in the different detection dimension;

The forming module 302 is used to form a multi-dimensional matrix structure; includes:

The multi-dimensional matrix structure includes a plurality of vertically distributed matrix layers, the multiple matrix layers include at least one pixel matrix layer and at least one probe matrix layer, each pixel matrix layer corresponds to represent an image data matrix, each probe matrix layer is used to represent a set of probe data groups, and each probe data element in the probe data group corresponds to its pixel element in the pixel matrix layer, and the values of the probe data element are determined according to the value assignment of the detection data.

The forming module is specifically used for:

According to the established mapping relationship, the pixel elements of the target object corresponding to each probe data of the target object are determined. The mapping relationship is used to represent the mapping relationship between the probe data at different positions of different detection dimensions in the detection domain of the other sensors and different pixel elements;

The probe data is assigned to the probe data element corresponding to the corresponding pixel element.

Optional, the process of establishing the mapping relationship includes:

The detection coordinate system of each sensor is changed through data processing, and the central axis of the detection domain of each sensor is consistent with the optical axis of the image acquisition sensor, and the detection vertex of the detection domain of each sensor coincides with the entrance pupil center of the image acquisition sensor;

According to the optical axis and the pupil center of the image acquisition sensor, after changing, the detection region of each sensor is projected to the two-dimensional plane where the imaging surface of the image acquisition sensor is located, and the projection area corresponding to each sensor is obtained;

The mapping relationship is determined according to the projection relationship between the projection area of the sensor and the current detection region, and the position relationship between the projection area in the two-dimensional plane and the imaging area of the image acquisition sensor.

Alternatively, the detection coordinate system is a space rectangular coordinate system or a spherical coordinate system.

Alternatively, the mapping relationship is specifically used to characterize the corresponding relationship between the probe data at different positions in the detection domain of the sensor and different single pixels, or:

The resolution of the other sensors does not match the resolution of the image acquisition sensor, and the mapping relationship is specifically used to characterize the corresponding relationship between the probe data at different positions in the detection domain of the sensor and different macroblocks, and the macroblock comprises at least two pixels.

Optional, if the resolution of the other sensors does not match the resolution of the image acquisition sensor, then:

The data elements in the probe matrix layer also include a first interpolation data element, and/or: the data elements in the pixel matrix layer also include a second interpolation data element.

Optional, the value of the probe data element is the corresponding probe data itself, or the value of the probe data element is determined according to the corresponding probe data conversion.

Alternatively, the matrix layers in the multidimensional matrix structure can be selectively activated.

Optional, the other sensors are at least one of the following: microwave radar, ultrasonic radar, Lidar, infrared sensor, and terahertz imaging sensor; the probe data of the other sensors include at least one of the following: distance data, velocity data, acceleration data, azimuth data, radar cross section RCS data, and thermal radiation temperature data;

The pixel data matrix includes at least one of the following: luminance data matrix, grayscale data matrix, RGB three-layer data matrix, R-layer data matrix, G-layer data matrix, B-layer data matrix, YUV three-layer data matrix, Y-layer data matrix, U-layer data matrix, V-layer data matrix, and optical flow data matrix.

The data processing device provided by the embodiment of the multi-sensor fusion can combine different dimensions of different sensors to be based on pixel elements and combined with multi-dimensional matrix structure, and then, it can be beneficial to data fusion and deep learning of the data acquired, and it can be beneficial to achieve more diverse and effective data mining and simultaneous interpreting, so it can support and produce more effective ability of environment perception and target detection.

Embodiment 2

The embodiment provides a multi-sensor fusion method, including:

The multi-dimensional probe data from multi-sensor are combined in the form of multi-dimensional pixel matrix, and a multi-dimensional depth perception matrix array with camera pixels as granularity is established;

In the multi-dimensional pixel matrix, the information contained in each pixel is expanded vertically. In addition to the brightness and color information it originally contains, it also adds multiple vertical dimensions for each pixel, the detection information by other sensors of the target object can be mapped by the pixel in the camera detection space with the corresponding multiple vertical dimensions for each pixel, and the detection information includes at least one of the following: relative distance, relative velocity, radar cross section RCS data of the target, thermal radiation temperature distribution of the target, etc; Among them, the multi-dimensional detection information is assembled on the target object description with the original image pixel as the unit in a hierarchical manner to generate multi-dimensional pixels, it is expressed as a matrix array with unified structure in mathematics, so that each pixel becomes a multi-dimensional pixel, and the multi-dimensional pixel matrix is obtained. The multi-dimensional pixel matrix can be understood as a unit of pixels, it is expressed as a multi-dimensional pixel matrix which is actually assembled by multiple matrices, the multi-dimensional matrix structure referred to in embodiment 1 is just the multi-dimensional pixel matrix correspondingly—the multi-dimensional pixel matrix and the multi-dimensional matrix structure represent the same meaning.

It can be seen that the embodiment combines the target probe data of multiple dimensions in the form of matrix array (similar to a three-dimensional matrix). On the basis of the two-dimensional image plane space imaged by the camera, the embodiment extends the information contained in each pixel. In addition to the brightness and color information originally contained, the embodiment also adds a plurality of vertical dimensions for each pixel, the information of multiple corresponding dimensions (such as relative distance, relative velocity, RCS data of radar cross section and thermal radiation temperature distribution of target) detected by other sensors of the target object unit mapped by the pixel in the camera detection space (object space) is input in the added vertical dimension, so the multi-dimensional information is assembled on the object descriptors which take the image pixel as the unit in a hierarchical way which is represented as a matrix array with unified structure mathematically. In this paper, the embodiment refers to the matrix array description of "multi-dimensional measurement parameters" of such target as "multi-dimensional pixel" structure. In each pixel of camera image we add more data such as the object distance (the range), the relative velocity, the RCS data of radar cross section and thermal radiation temperature distribution of target brought by other sensors (radar and infrared sensor . . . ) to increase the depth of system perception, therefore a multi-dimensional depth perception matrix array with camera pixels as granularity is established, the traditional image pixel becomes "multi-dimensional pixel"; In this embodiment, the probe data in different dimensions are combined in the form of matrix array to form a matrix array of "multi-dimensional measurement parameters", referred to as multidimensional pixel matrix.

The matrix array (i.e. multidimensional pixel matrix) of "multi-dimensional measurement parameters" is shown in FIG. 2 to FIG. 4. The embodiment can also add more data dimensions (data encapsulation with more sensors) on this basis, and the combination mode is the same. In addition, the order of the vertical matrix array can be changed (of course, the change of the order may mean that machine learning needs to be retrained again).

According to the above description, combined with the schematic diagram in FIG. 2 and FIG. 3, with the input of the image data and probe data group for the implementation of the scheme, the multidimensional matrix structure is obtained based on the image data and probe data group, and the image data is represented by pixel matrix; Then, a multi-dimensional matrix structure including multiple matrix dimensions can be obtained, this multi-dimensional pixel matrix is the same as the "multi-dimensional pixel matrix" mentioned above; the multi-dimensional pixel matrix must contain the probe matrix layer corresponding to the detection data, that is, the layered content in the vertical dimension mentioned above; The multi-dimensional pixel matrix must also contain the pixel matrix layer corresponding to the pixel, that is, the pixels with the brightness and color information originally involved, each pixel can be expressed as a pixel element, the pixel element and the probe data element must correspond vertically inside the matrix; From the above description that the contents of step S11 and step S12 shown in FIG. 1 of embodiment 1 can be deduced obviously.

In some special cases, only the monochromatic camera will participate in the combination of multi-sensor, for example, the camera is only used for infrared imaging scene, and the camera only outputs monochromatic image; in this case, the multi-dimensional pixel structure of the embodiment is still valid, only the RGB (or YUV) three-layer input data is changed to a single-layer Y (pixel brightness) data structure, and the same multi-dimensional pixel structure method is used to combine/group the input information of other sensors to generate a matrix array of "multi-dimensional measurement parameters", or, "multi-dimensional pixel matrix" in other word.

Namely, the camera is a color camera or a monochromatic camera;

If the camera is a color camera, the output data matrix of the color camera is RGB or YUV, and the multi-dimensional pixel matrix is obtained by encapsulating the detection information of other sensors on the three-layer data matrix;

If the camera is a monochromatic camera, the camera only outputs monochromatic images, and the multi-dimensional pixel matrix is obtained by combining the detection information of other sensors on the basis of single-layer pixel brightness.

The cross-sectional coordinates of the multi-dimensional pixel are equal to the pixel coordinates of the camera image plane, because the multi-dimensional pixel is expanded based on the pixel information of the camera image plane, and each pixel is combined with the information of a plurality of longitudinal dimensions; in this embodiment, the "pixel (x, y)" whose position is in (x, y) from the camera pixel plane (x, y), the extended multi-dimensional pixel is so called "multi-dimensional pixel (x, y)".

For the relative distance, relative velocity and radar cross section RCS data of target brought by radar and other sensors, the embodiment can directly assign the value of relative distance, relative velocity and radar cross section RCS data to the matrix layer corresponding to each multi-dimensional pixel, or these values can be calculated by the corresponding formula firstly, and then the calculation results are assigned to the corresponding matrix layer of each multi-dimensional pixel—For example: this embodiment wants to input the corresponding value of RCS mapped to radar receiving power P in the R (RCS) layer of multi-dimensional pixel, then the RCS value of "multi-dimensional pixel (x, y)" corresponding to the cross-section coordinate position of (x, y) of multi-dimensional pixel is calculated as follows: $P(x, y) = RCS(x, y)/(L(x, y))^4$, where RCS (x, y) refers to the RCS data in "multi-dimensional pixel (x, y)" and L (x, y) refers to the relative distance value of radar detecting target in "multi-dimensional pixel (x, y)". Therefore, the multi-dimensional pixel adds the data from other sensors such as distance, relative velocity, radar cross-section RCS data and thermal radiation temperature data of target by mapping on the basis of each pixel, the data can be the direct assignment of probe data or the value of these data after function conversion, as shown in FIG. 2.

The process and data structure of system data processing are as follows: (array of multilayer structure): firstly, target data from different sensors are grouped in this embodiment. In the first step of this embodiment is to use the method of geometric space transformation to associate the detection domains (physical space regions of data acquisition) of each sensor in the standard three-dimensional Euclidean solid geometry space (space coordinate system is marked as X/Y/Z axis) to establish a one-to-one correspondence relationship.

Since the space position of each sensor may be different, the embodiment calculates the central axis (X'/Y'/Z' axis) of each sensor's respective detection domain (respective detection space) through the space parameters of the sensor installation, and then unifies them into the 3D detection space (object field of view) coordinates of the camera by translating, rotating and zooming their respective coordinate systems; Then, according to the detection domain of radar, infrared thermal imager and other sensors, the mapping relationship (2D object plane in object space) corresponding to the camera imaging surface is established.

Then, the target data detected by these sensors is connected with each pixel of the camera image according to the mapping relationship, and the target probe data are assigned to the corresponding positions in the multi-dimensional pixel matrix one by one.

From the above description, it is clear that since the mapping relationship is established between the detection domain and the object surface, the mapping relationship between the points in the detection domain and the object surface must be characterized, therefore, the use of the mapping relationship must be to determine which pixel the probe data in the detection domain is mapped to, that is, it can be inferred without doubt that step S121 needs to be carried out, and, since the assignment must be assigned to the sensor matrix layer, it can be inferred without doubt that step S122 needs to be implemented—therefore, through the above contents, the contents of step S121 and step S122 shown in FIG. 5 can be deduced without doubt.

Since the real system often has product tolerance and installation error, this embodiment can also detect the central axis (X'/Y'/Z' axis) of each sensor's respective detection domain (respective detection space) by combining with geometric calibration method, and then unify them into the same coordinate system through translation, rotation and scaling of their respective coordinate systems, so as to establish a unified detection region of the system, a one-to-one correspondence relationship is established between the independent detection areas of each sensor in the unified region of the system. (The method of geometric calibration is as follows: in this embodiment, the target is placed at multiple positions to determine the spatial position coordinates, and then the position readings of these targets measured by the sensor are used to establish a mapping relationship between the target position readings and their physical spatial positions in reality, so as to establish the corresponding relationship between the coordinate reading of the sensor detecting the target space and the actual geometric space position).

In this embodiment, the algorithm can be used to adjust the geometric space mapping relationship to reduce the geometric mapping positioning error. The principle is as follows: after the final target of the system is detected, the embodiment makes independent positioning calculation for multiple detected targets in the detection space area of respective sensors, maps the final result to the corresponding matrix array (layer) of "multi-dimensional pixel", and compares (calculates) in this dimension (current layer) and generates it by using geometric space transformation method; then, the relative position of the corresponding matrix array (layer) and the pixel layer of the camera is zoomed and translated to reduce the error, that is to reduce the "geometric mapping positioning error" and adjust the values in the corresponding data matrix array (layer) of "multi-dimensional pixel" according to the new pixel vertical correspondence relationship. In this way, the embodiment can further reduce the mapping error caused by the geometric space transformation of different axes, and make the combination of "multi-dimensional pixel" matrix array more accurate.

From the above description, it can be known without doubt that the error is determined by positioning the object, then mapping the positioning result to the pixel matrix layer, comparing it with the result of identifying the same object by using the mapped relation mapping. It can be seen that the content of the above embodiment can undoubtedly infer the scheme of step S16 in embodiment 1.

After the unified detection domain of the system is established, the spatial projection relationship of the detection domain of the multi-sensor combination is shown in FIG. 9. Since the combination of multi-dimensional pixels in the embodiment is "each pixel is added with a plurality of vertical dimensions, the information of multiple corresponding dimensions detected by other sensors of the target object unit mapped by the pixel in the camera detection space (object space) is input in the increased vertical dimension", so the detection space of other sensors is uniformly mapped to the camera detection space and aligned with the optical axis, and the vertex of other sensors' detection domain coincides with the entrance pupil center of the camera— Referring to FIG. 9 and FIG. 10, the optional scheme of this embodiment can adopt the combination of camera+radar+ infrared thermal imager as of a typical combination example; if other sensors are added, the principle of multi-dimensional pixel data mapping is the same.

In practical application, each sensor should be installed as close to the coaxial line as possible in the spatial structure, and the closer the sensors are the less mapping error caused by the geometric space transformation of different axes (the result is similar to virtual image).

Since the spatial angle resolution of radar and infrared sensor may be different from that of camera at the initial input (the spatial angle resolution of radar is not high at present), this embodiment will adopt interpolation method to solve this problem during data assembly.

After the matrix array corresponding to the multi-dimensional pixels is generated, the following embodiment can analyze and process the data of each layer by using various traditional characteristic value+classifiers to detect the target; the neural network & AI algorithm can also be used for subsequent detection processing; or a mixture of the two. Either way, since the embodiment unifies the multi-dimensional target detection information into a matrix array and combines them by mapping with pixels as the unit, such deep fusion data combination is of great help to the improvement of target detection quality. Especially for the neural network, due to the input of multi-dimensional pixel matrix, the network will generate more layers of feature map, and have more abundant multi-layer and multi-dimensional feature extraction, thus by this embodiment the system can detect and locate the target with higher efficiency and quality. The multi-dimensional pixel matrix matches the algorithm very well. The current popular neural network algorithms, such as R-CNN, fast R-CNN, SSD, etc., can be applied by making corresponding changes to the multi-dimensional pixel matrix input (multi-layer input) of the embodiment.

In this embodiment, machine learning is often used for target detection, which will involve target sample collection and system training. The matrix array description method (multi-dimensional pixel) of the multi-dimensional measurement parameters of the embodiment brings convenience to the collection and training of the target samples; the information of each layer of the multi-dimensional pixel is relatively independent, and the structure of each layer can be increased or decreased, and one or more layers of the multi-dimensional measurement parameters can be activated dynamically in the subsequent processing (the information of these layers participates in the determination and description of the target) or not activated, no matter if the information of these layers does not participate in the determination and description of the target, it does not hinder the detection and marking of the target with multi-dimensional pixel structure. The embodiment suggests that all matrix array layers of multi-dimensional pixels be activated when the target sample is collected, but the activation of the specific matrix array layer can be dynamically selected and used for machine learning training according to the specific scenario (day, night, overlapping state of sensor detection field of view, etc.) to match them correspondingly. For the multi-sensor detection area, regardless of several combinations, the embodiment can organically combine them with the "multi-dimensional pixel" matrix array, and use the same processing algorithm framework to detect the target; their training methods (including the collection of data samples) can also be integrated and realized at one time. This is another technical feature of the present embodiment, and it is also an advantage brought by the method of using the "multi-dimensional pixel" structure to describe the target object.

In this embodiment, a multi-sensor fusion system is composed of a camera, a microwave radar and an infrared thermal imager. This is a common multi-sensor combination. The camera outputs color image (RGB or YUV data), microwave radar outputs the detection target distance, relative velocity, azimuth and radar cross section (RCS) data of the target, and infrared thermal imager outputs the thermal radiation temperature distribution image of the target. Such a combination can sense and detect targets from multiple dimensions, and can work effectively in a variety of working conditions (day, night, fog, rain, etc.). In this embodiment, a variety of sensors can be flexibly combined and activated, so here we can use all three (camera+microwave radar+infrared thermal imager) in one system, and can also adopt the way of combination in pairs: camera plus microwave radar, camera plus infrared thermal imager, or even combination of microwave radar and infrared thermal imager. Since the multi-dimensional target probe data are combined in the form of matrix array (similar to a three-dimensional matrix), the system can dynamically adjust/change the dimension of the sensor input parameters for target recognition according to hardware configuration or scenario (under different working conditions such as day and night), and use multi-dimensional pixel subset—for example, when driving at night, the embodiment needs to detect the target beyond the range of car lamp illumination, and the embodiment can only activate the input matrix of radar and the input matrix of infrared thermal imager. It can even take the way of dynamic configuration of hardware to add or remove a kind of sensor dynamically, and the system can still work. The support of flexible combination ability of system hardware can not only provide the flexibility of system hardware cost optimization, but also bring benefits to users: in a certain scenario, one of the sensors of the system fails (or is damaged), and the system can still maintain effective operation through software configuration adjustment, thus enhancing the robustness of system operation. In some applications, such as ADAS or autopilot, it is necessary to increase the robustness of the system.

From the above description of activation, it is certain that part of the matrix layer is activated and part of it is not activated. Therefore, there is no doubt that the matrix layer can be selectively activated.

Because the detection field of each sensor may be different, the mapping relationship between them may overlap. As shown in FIG. 10, the single solid wire frame on the outside represents the imaging area of the camera, the single solid wire frame inside represents the imaging area of the infrared thermal imager, and the identification area in the dotted line box is the radar detection area, which partially overlaps to form a staggered detection area: 1) Class A area is the area jointly detected by three kinds of sensors; 2) class B and class C are areas jointly detected by radar and camera; 3) areas D and E are areas jointly detected by camera and infrared thermal imager; 4) class G area is only detected by camera. The most concerned area of this embodiment is the area explored by the three sensors (class A area), which can make the most of the accurate detection of multi-dimensional data brought by multi-sensor fusion. The second important area is the overlapping area of camera and Radar (B and C areas), the detection dimensions of camera and radar are very complementary, so to do the sensor fusion of these two sensors is also very meaningful. The third important fusion area is the area where the camera and the infrared thermal imager overlap, in this area, the infrared thermal imager can make up for the deficiencies of the camera in the working conditions of night and fog; however, since both of them produce image information, the information fusion between them will bring more technical challenges from matching with the resolution above, and image interpolation is needed to scale-up the image resolution (number of pixels) of the infrared sensor, or reduce the resolution of the camera image to achieve mutual matching, and then, the image of the infrared sensor (marked as H dimension in this embodiment) is attached to the matrix array of RGB (or YUV) data structure with the camera.

In area A (the area detected by the three sensors), the camera arranges the collected data in three layers according to RGB color (the order can be exchanged), assuming that the image size (i.e. resolution) of each layer is X*Y (for example: 1920*1080)—If the original data input is YUV format, it can also be arranged in three layers according to YUV. However, the embodiment suggests that it is better to convert it to RGB data structure (YUV to RGB), because it can reduce the association of data in each layer and facilitate subsequent independent feature extraction. In this embodiment, the three-dimensional data structure (size: X*Y*3) is taken as the "camera's original data input layer", and then, the data collected by microwave radar is added to the original data input layer of the camera according to the structure of multi-dimensional pixels.

If the radar data is directly matched with the camera pixel data, the radar data is too sparse. If we want to match the camera image data point by point according to the pixel relationship, we need to do some processing firstly and convert the radar data into intensive class image data with tensor structure. In this embodiment, the embodiment designs the following method to input radar data into the system "multi-dimensional pixel matrix" of the embodiment: 1) Using the geometric projection method, the radar detection space is projected onto the 2D object surface corresponding to the camera imaging surface as the 2D mapping surface of the radar target (as shown in FIG. 3). Its 2D spatial resolution is equal to the pixel resolution of the matched camera in the system, and the one-to-one mapping relationship between radar data and camera data is established; The target (image) detected by radar is mapped to the 2D mapping surface of radar target to generate "radar perception matrix"; On the matrix layer (depth), the data (layer) of radar perception matrix is composed of the following "radar raw data input": L(target distance value) layer, S (relative velocity value) layer, R (radar cross section value) layer; similarly, the order of these layers can be interactive or flexibly combined (L, S, R are all activated), Or choose only one of them (L or S or R) or two of them (L+S, S+R, etc.). At present, the spatial resolution of millimeter wave radar is relatively low, and the angular resolution of the target is not high, resulting in a relatively large "possible coverage area" of its projection on the 2-D mapping surface of the target. It is similar to that the original pixel particle size of radar is larger than the pixel size of camera thus the resolution is low. In order to assign a corresponding value to each layer of data matrix of each "multi-dimensional pixel", the interpolation need to be implemented—it is necessary to interpolate the "radar two-dimensional mapping surface" to improve its resolution and make it match with the pixels of the camera, and then each "multi-dimensional pixel" is assigned the data one by one accordingly. The commonly used interpolation methods, such as nearest neighbor interpolation, bilinear interpolation and cubic convolution method can be used. 2) Since the radar data is sparse, in the radar data structure (matrix data layer L, S, R, etc.), the radar data will be assigned one by one corresponding to the area where the radar has detected the target. However, in the areas where no target is detected, the embodiment assigns "0" to the original radar data corresponding to these areas, or according to the preset default value representing the background, so as to ensure that each matrix element in the radar data matrix has a value.

The image collected by infrared thermal imager is also in pixels. In this embodiment, the resolution of the image is amplified by appropriate interpolation to match the resolution of the camera. The image collected by the infrared thermal imager (generally the brightness pixel information of black and white) is assigned point by point to the corresponding matrix in the "multi-dimensional pixel" data structure—in this embodiment, it is called "H" matrix. In general, the resolution of the infrared thermal imager is lower than that of the traditional camera—in this embodiment, the infrared thermal image resolution is interpolated to get scaled up. Of course, the image resolution of the infrared thermal imager could be higher than traditional camera installed in the system, if so, the resolution of the thermal imager need to be reduced—In short, the basic principle is to make the resolution of the two sensors the same through the reasonable scaling of the image, and then assign the corresponding data layer of the multi-dimensional pixel.

From the above list, it can be seen that after interpolation, the matrix must contain interpolation data elements, that is, it can undoubtedly get the conclusion that the matrix can have the interpolation data input.

For the combination of multi-sensor, the most common case of "camera+millimeter wave radar+infrared thermal imager" is selected in this embodiment as example. The combination is flexible and diverse. Three kinds of sensors can be selected to form a system, or two kinds of sensors (camera+others) can be selected to form a system. The number of sensors is also flexible configuration, which can be more than one camera such as the system consists of three radars and several thermal imagers. But the principle of various combinations is: camera output color image (RGB or YUV data), microwave radar output detection target distance, relative velocity, azimuth and radar cross section of target RCS data, the infrared thermal imager outputs the temperature distribution image of the target, the system have these physical detected data mapped to the detection target, so that the detection target can be detected, classified and recognized beyond the detection dimension of a single sensor, and the system can have better target detection rate and better recognition ability and recognition quality.

In the system of the embodiment, on the basis of selecting the combination of "camera+millimeter wave radar+infrared thermal imager", the embodiment can also introduce other kinds of sensors, such as Lidar, etc., and the detection parameters brought by the new sensor can also be added into the previous data structure combination of the "camera+ millimeter wave radar+infrared thermal imager" system and to be the additional part of "multi-dimensional pixel".

In this embodiment, the multi-sensor is used to identify the target from multiple detection dimensions. In this embodiment, the target probe data of multiple dimensions are combined in the form of matrix array (similar to a three-dimensional matrix). Each "multi-dimensional pixel" of the matrix array of the data organically combines the multi-dimensional sensing detection information, and in a unit (In a "multi-dimensional pixel"), such a structure brings great convenience to the subsequent data processing (whether using the traditional method of "characteristic value+classifier", neural network method, or a combination of both, or, other machine learning algorithm) as well as collecting the samples for machine learning training. Such data assembly is also very effective for spatial navigation and positioning (such as SLAM), because in the "multi-dimensional pixel" description system of the present embodiment, the description of the target object not only has the characteristic data (for classification and recognition), but also has the three-dimensional position space information (the spatial angle on the XY axis and the distance from the detector to the target), and the result of target recognition can be directly used for spatial positioning.

This embodiment is applicable to automotive vehicle driving assistance system (ADAS) and autonomous driving system, robot, AGV, and various equipment and systems that need the ability of environmental sensing and target detection.

Figure 12:
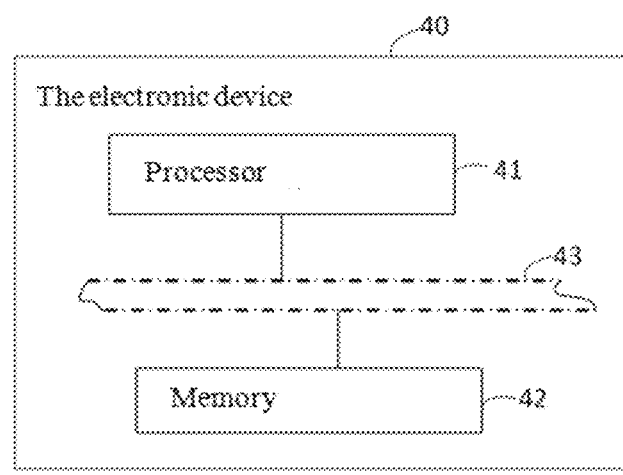
FIG. 12 is the example in the invention—Structure diagram of electronic equipment.

FIG. 12 is a structural diagram of an electronic device in an embodiment of the present invention.

Referring to FIG. 12, the electronic device 40 may include a memory 42 and a processor 41. The memory 42 is used for storing sensing data, intermediate operation data, system output data and executable instructions of the processor 41. The processor 41 is configured to execute the method of embodiments 1 and 2 and their alternatives by executing the executable instructions.

The memory 42 and the processor 41 can communicate through the bus 43.

Figure 13:
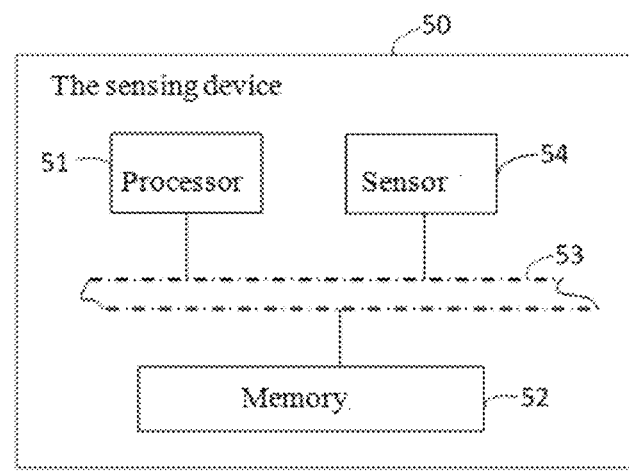
FIG. 13 is the example in the invention—Structure diagram of sensing equipment.

FIG. 13 is a structural diagram of a sensing device in an embodiment of the present invention.

Referring to FIG. 13, the sensing device 50 includes a memory 52, a processor 51, and a sensor 54; the memory 52 is used to store sensing data, intermediate operation data, system output data, and executable instructions of the processor 51; the processor 51 is configured to execute the methods of embodiments 1 and 2 and their alternatives by executing the executable instructions.

The memory 52, processor 51 and sensor 54 can communicate through bus 53.

An embodiment of the invention also provides a storage medium, which stores sensing data, intermediate operation data, system output data and programs. When the program is executed by a processor, the method involved in embodiment 1, embodiment 2 and their optional schemes is implemented.

Finally, it should be stated that: the above embodiments as the examples are only used to illustrate and explain the technical solutions of the invention, not to restrict them; The application implements can be more than the examples we listed in this paper, and although the invention has been described in detail with reference to the above-mentioned embodiments, it's a common sense that some features and implementation details can be modified and to be different. However, the applications with some feature & implementation modified doesn't means that they become new invention, in case they follows this invention's principles and methodologies then they are still in the scope of this invention.

What is claimed is:

1. A data processing method of multi-sensor fusion, comprising:
   obtaining image data and at least one set of probe data groups of a target object, wherein the image data is detected by an image acquisition sensor, and the at least one set of probe data groups is detected by other sensors, wherein the image data is used to represent an image of the target object collected by the image acquisition sensor by using at least one pixel data matrix, the at least one set of probe data groups are probe data in different information dimensions captured from the other sensors; and
   forming a multi-dimensional matrix structure, wherein the multi-dimensional matrix structure includes a plurality of vertically distributed matrix layers, the plurality of vertically distributed matrix layers include at least one pixel matrix layer and at least one probe matrix layer, each of the at least one pixel matrix layer corresponds to each of the at least one pixel data matrix, each of the at least one probe matrix layer is used to represent a set of the at least one set of probe data groups, probe data elements in the at least one probe matrix layer correspond to pixel elements in the pixel matrix layer, and values of the probe data elements are determined according to value assignment of the probe data, wherein forming the multi-dimensional matrix structure comprises:
      determining the corresponding pixel elements of the target object for each probe data of the target object according to an established mapping relationship, wherein the mapping relationship maps between positions of the probe data of various probe dimensions in detection domains of the other sensors and the pixel elements;
      assigning the probe data to the probe data element corresponding to the corresponding pixel element,
      wherein establishing the mapping relationship comprises:
         changing detection coordinate system of each of the other sensors through data processing, wherein a central axis of the detection domain of each of the other sensors is consistent with an optical axis of the image acquisition sensor, and a detection vertex of the detection domain of each of the other sensors coincides with an entrance pupil center of the image acquisition sensor;
         projecting a detection region of each of the other sensors to a two-dimensional plane where an imaging area of the image acquisition sensor is located according to locations of the optical axis and the entrance pupil center of the image acquisition sensor after changing the detection coordinate system, wherein a projection area corresponding to each of the other sensors is obtained; and
         determining the mapping relations according to the position relationship between the projection area in the two-dimensional plane and the imaging area of the image acquisition sensor.

2. The method according to claim 1, which is characterized in that if resolution of the other sensors does not match resolution of the image acquisition sensor, then:
   the probe data elements in the probe matrix layer also include at least one of a first interpolation data element, and a second interpolation data element;
   the value of the probe data element is the corresponding probe data itself, or the value of the probe data element is determined according to the corresponding probe data conversion;
   matrix layers in the multi-dimensional matrix structure is selectively activated.

3. The method according to claim 1, which is characterized in that after forming the multi-dimensional matrix structure, the method also comprises:
   positioning one or more reference target objects detected in the detection domain of the other sensors, and obtaining a target positioning result, wherein the target positioning result is used to represent the position of the reference target object in a detection space;
   obtaining a calibration positioning information by mapping a position represented by the target positioning result to the pixel matrix layer;
   obtaining a positioning error information by comparing the calibration positioning information with an original positioning information, wherein the original positioning information is used to represent a position of the pixel elements determined in the pixel matrix layer when the multi-dimensional matrix structure is formed for the target object;
   adjusting the corresponding probe matrix layer to change a correspondence relationship between the probe matrix layer and the pixel matrix layer; and
   adjusting the assignment value of the probe data element in the probe matrix layer according to the changed correspondence relationship.

4. The method according to claim 1, wherein the other sensors include at least one of the following: microwave radar, ultrasonic radar, Lidar, infrared sensor, and terahertz imaging sensor,
   the probe data of the other sensors includes at least one of the following: range data or distance data, velocity data, acceleration data, orientation data, radar RCS data, and thermal radiation temperature data; and
   the pixel data matrix includes at least one of the following: luminance data matrix, grayscale data matrix, RGB data matrix, R data matrix, G data matrix, B data matrix, YUV data matrix, Y data matrix, U data matrix, V data matrix and optical flow data matrix.

5. A data processing device for multi-sensor fusion, comprising:
   an acquisition module comprising an image acquisition sensor and other sensors, wherein the acquisition module is used to obtain image data of a target object and at least one set of probe data groups, the image data is detected by the image acquisition sensor, and at least one set of the probe data groups is detected by the other sensors, the image data is used to characterize a target image collected by the image acquisition sensor using at least one pixel data matrix, and the at least one set of the probe data groups are probe data in different information dimensions captured from the other sensors; and
   a forming module comprising a memory and a processor, wherein a program is stored in the memory, the program is used to form a multi-dimensional matrix structure when executed by the processor, the multi-dimensional matrix structure includes a plurality of vertically distributed matrix layers, the plurality of vertically distributed matrix layers include at least one pixel matrix layer and at least one probe matrix layer, each of the at least one pixel matrix layer corresponds to a pixel data matrix, each of the at least one probe matrix layer is used to represent a set of the at least one set of probe data groups, and probe data elements in the probe data groups correspond to pixel elements in the pixel matrix layer, and values of the probe data elements are determined according to value assignment of the probe data, wherein the multi-dimensional matrix structure is formed by:

determining the corresponding pixel elements of the target object for each probe data of the target object according to an established mapping relationship, wherein the mapping relationship maps between positions of the probe data of various probe dimensions in detection domains of the other sensors and the pixel elements;

assigning the probe data to the probe data element corresponding to the corresponding pixel element, wherein establishing the mapping relationship comprises:
changing detection coordinate system of each of the other sensors through data processing, wherein a central axis of the detection domain of each of the other sensors is consistent with an optical axis of the image acquisition sensor, and a detection vertex of the detection domain of each of the other sensors coincides with an entrance pupil center of the image acquisition sensor;

projecting a detection region of each of the other sensors to a two-dimensional plane where an imaging area of the image acquisition sensor is located according to locations of the optical axis and the entrance pupil center of the image acquisition sensor after changing the detection coordinate system, wherein a projection area corresponding to each of the other sensors is obtained; and determining the mapping relations according to the position relationship between the projection area in the two-dimensional plane and the imaging area of the image acquisition sensor.

6. The method according to claim 1, characterized in that after forming the multi-dimensional matrix structure, the method further comprising:

forming a multi-dimensional probe data from a multi-dimensional pixel matrix, and establishing a multi-dimensional depth perception matrix array with the pixel elements, wherein in the multi-dimensional pixel matrix, information contained in each pixel is expanded, a plurality of dimensions are added for each pixel in addition to the originally contained brightness and color information, and detection information of multiple dimensions detected by the other sensors on the target object mapped by the pixel elements in a detection space of the image acquisition sensor and input into the added dimension, the information includes at least one of the following: distance data, velocity data, radar target RCS data, and target thermal radiation temperature distribution data, multi-dimensional detection information is assembled on an object description which originally takes the pixel elements as a unit to generate multi-dimensional pixels represented as a matrix array, so that each original pixel becomes a multi-dimensional pixel with at least one of the following additional data: distance data, velocity data, radar target RCS data, and target thermal radiation temperature distribution data.

7. The method according to claim 1, wherein the image acquisition sensor is a color camera or a monochromatic camera;

If the image acquisition sensor is a color camera, an output data matrix of the color camera is RGB or YUV, and the multi-dimensional pixel matrix is obtained by encapsulating probe information of the other sensors on a three-layer data matrix;

If the image acquisition sensor is a monochromatic camera, the monochromatic camera only outputs monochromatic images, and the multi-dimensional pixel matrix is obtained by combining the probe information of the other sensors on the basis of single-layer pixel brightness matrix.

8. The method according to claim 1, which is characterized in that the multi-dimensional probe data from the other sensors are combined in the form of a multi-dimensional pixel matrix, before establishing a multi-dimensional depth perception matrix array with image pixels as the granularity (base unit), the method also includes:

establishing a unified detection domain, and the mapping relationship of a detection space of the other sensors is transformed into a three-dimensional detection space of the image acquisition sensor through a spatial coordinate transformation as the follows:

through translation, rotation and zooming of respective coordinate systems, unifying the detection space of the other sensors into space coordinates the three-dimensional detection space of the image acquisition sensor to aligned with the image acquisition sensor's optical axis to establish the unified detection space and common detection perspective;

then, according to the mapping relationship of detection fields of the other sensors (except the camera) on a 2-dimensional object surface corresponding to the imaging area of the image acquisition sensor, detection data from multiple dimensions of the other sensors is combined in the form of a multi-dimensional pixel matrix, and a multi-dimensional depth perception matrix array with image pixels as granularity is established, such as:

according to the mapping relationship, the target objects detected by other sensors are corresponding to each pixel imaged by the image acquisition sensor, and the detection information of various corresponding dimensions detected by the other sensors of the target object mapped by the image pixel in the detection space of the image acquisition sensor are assigned to the corresponding positions in the multi-dimensional pixel matrix one by one.

9. The method according to claim 1, which is characterized in that after the target object is detected, multiple detected targets in detection domain are independently positioned in the respective sensor detection space area, and a final result is mapped to a corresponding matrix array of multi-dimensional pixels to compare positioning error of the target object with previous geometric space conversion method, then zoom and translate relative position of the corresponding matrix array and the pixel layer of the image acquisition sensor to reduce error, at the same time, values in the corresponding matrix array of the multi-dimensional pixels are adjusted according to a new vertical correspondence relationship.

10. The method according to claim 1, which is characterized in that the other sensors are at least one of the following: microwave radar, ultrasonic radar, Lidar, infrared sensor, and terahertz imaging sensor; the probe data of the other sensors includes at least one of the following: range data or distance data, velocity data, acceleration data, orientation data, radar RCS data, and thermal radiation temperature data; and the pixel data matrix includes at least one of the following: luminance data matrix, grayscale data matrix, RGB data matrix, R data matrix, G data matrix, B data matrix, YUV data matrix, Y data matrix, U data matrix, V data matrix and optical flow data matrix.

11. The method according to claim 2, which is characterized in that the other sensors are at least one of the following: microwave radar, ultrasonic radar, Lidar, infrared sensor, and terahertz imaging sensor; the probe data of the other sensors includes at least one of the following: range data or distance data, velocity data, acceleration data, orientation data, radar RCS data, and thermal radiation temperature data; and the pixel data matrix includes at least one of the following: luminance data matrix, grayscale data matrix, RGB data matrix, R data matrix, G data matrix, B data matrix, YUV data matrix, Y data matrix, U data matrix, V data matrix and optical flow data matrix.

12. The method according to claim 3, which is characterized in that the other sensors are at least one of the following: microwave radar, ultrasonic radar, Lidar, infrared sensor, and terahertz imaging sensor; the probe data of the other sensors includes at least one of the following: range data or distance data, velocity data, acceleration data, orientation data, radar RCS data, and thermal radiation temperature data; and the pixel data matrix includes at least one of the following: luminance data matrix, grayscale data matrix, RGB data matrix, R data matrix, G data matrix, B data matrix, YUV data matrix, Y data matrix, U data matrix, V data matrix and optical flow data matrix.

\* \* \* \* \*